US012681991B2

(12) United States Patent
TCA et al.

(10) Patent No.: US 12,681,991 B2
(45) Date of Patent: Jul. 14, 2026

(54) PROACTIVE DETERMINATION OF DATA INSIGHTS

(71) Applicant: Sumo Logic, Inc., Redwood City, CA (US)

(72) Inventors: Bashyam TCA, Walnut Creek, CA (US); David M. Andrzejewski, San Francisco, CA (US); Tejaswi Redkar, San Ramon, CA (US); Aaishwarya Bansal, Waterloo (CA); Rohith Kumar Poshala, Milpitas, CA (US); Michael J. Haskell, San Jose, CA (US); Ayan Ghatak, Kolkata (IN)

(73) Assignee: Sumo Logic, Inc., Redwood City, CA (US)

( * ) Notice: Subject to any disclaimer, the term of this patent is extended or adjusted under 35 U.S.C. 154(b) by 0 days.

(21) Appl. No.: 18/408,866

(22) Filed: Jan. 10, 2024

(65) Prior Publication Data

US 2025/0077582 A1      Mar. 6, 2025

Related U.S. Application Data

(63) Continuation-in-part of application No. 18/241,487, filed on Sep. 1, 2023, now Pat. No. 12,182,111.

(51) Int. Cl.
*G06F 16/90*          (2019.01)
*G06F 16/2457*       (2019.01)
*G06F 16/9032*       (2019.01)

(52) U.S. Cl.
CPC .. *G06F 16/90328* (2019.01); *G06F 16/24578* (2019.01)

(58) Field of Classification Search
CPC . G06F 16/243; G06F 11/0787; G06F 16/2445
(Continued)

(56) References Cited

U.S. PATENT DOCUMENTS 7,840,538 B2 * 11/2010 Joshi ..................... G06F 16/332
                                                            707/672
7,984,004 B2 *  7/2011 Andrew .............. G06F 16/3322
                                                            707/706
(Continued)

OTHER PUBLICATIONS

"U.S. Appl. No. 18/241,487, Non Final Office Action mailed May 20, 2024", 11 pgs.

(Continued)

*Primary Examiner* — Hicham Skhoun
(74) *Attorney, Agent, or Firm* — Schwegman Lundberg & Woessner, P.A.

(57) ABSTRACT

Methods, systems, and computer programs are presented for providing contextual suggestions and automated responses to users managing incidents within production or security environments. The system utilizes a combination of user-provided data and contextual analysis to proactively offer solutions and insights without requiring explicit queries from the user. The system integrates out-of-the-box insights, natural language interactions, and remediation flows into a cohesive user experience, incorporating playbooks enhanced by automation while leveraging user data and interaction history to tailor suggestions. The system includes a predictive analysis mechanism that runs analyses on relevant data sources, identifying unusual results and generating potential queries. A large language model (LLM) is integrated for generating questions and analyses, with a ranking system prioritizing insights based on machine learning models. A user interface features a suggestions panel with distinct categories for exploration, refinement, and action, enhancing the user interface with contextually relevant and actionable insights.

17 Claims, 19 Drawing Sheets

(58) Field of Classification Search
USPC ........................................................ 707/728
See application file for complete search history.

(56) References Cited

U.S. PATENT DOCUMENTS

| | | | | |
|---|---|---|---|---|
| 8,874,550 | B1 | 10/2014 | Soubramanien et al. | |
| 9,740,780 | B1 * | 8/2017 | Herscovici | G06F 16/3322 |
| 10,546,336 | B2 | 1/2020 | Kasai | |
| 11,194,794 | B2 * | 12/2021 | Oliner | G06N 20/00 |
| 11,288,319 | B1 * | 3/2022 | Das | G06F 40/186 |
| 11,769,017 | B1 | 9/2023 | Gray et al. | |
| 12,182,111 | B1 | 12/2024 | Tca et al. | |
| 2005/0149496 | A1 * | 7/2005 | Mukherjee | G06F 16/24575 |
| 2007/0294251 | A1 * | 12/2007 | Vadai | G06F 16/337 |
| | | | | 707/999.102 |
| 2008/0071740 | A1 * | 3/2008 | Jhala | G06F 16/3322 |
| 2008/0294630 | A1 * | 11/2008 | Yan | G06Q 30/0256 |
| | | | | 707/999.005 |
| 2009/0119259 | A1 | 5/2009 | Williams et al. | |
| 2009/0248626 | A1 * | 10/2009 | Miller | G06F 16/954 |
| 2010/0281029 | A1 | 11/2010 | Parikh et al. | |
| 2011/0184951 | A1 * | 7/2011 | Paparizos | G06F 16/951 |
| | | | | 707/E17.089 |
| 2012/0096030 | A1 * | 4/2012 | Kim | G06F 16/3349 |
| | | | | 707/E17.014 |
| 2012/0203772 | A1 * | 8/2012 | Cucerzan | G06F 16/3338 |
| | | | | 707/723 |
| 2015/0193538 | A1 * | 7/2015 | Maddison | G06F 16/70 |
| | | | | 707/706 |
| 2017/0329854 | A1 * | 11/2017 | Panuganty | G06F 16/951 |
| 2019/0146978 | A1 | 5/2019 | Beedgen et al. | |
| 2020/0065412 | A1 * | 2/2020 | Braundmeier | G06N 3/048 |
| 2020/0364561 | A1 * | 11/2020 | Ananthanarayanan | |
| | | | | H04L 63/1425 |
| 2021/0374153 | A1 | 12/2021 | Saxena et al. | |
| 2022/0107802 | A1 | 4/2022 | Rao et al. | |
| 2023/0027628 | A1 * | 1/2023 | Wu | G06F 16/9038 |
| 2023/0394040 | A1 * | 12/2023 | Gupta | G06F 16/90324 |
| 2023/0394045 | A1 * | 12/2023 | Nixon | G05B 19/41865 |
| 2024/0362208 | A1 * | 10/2024 | Naufel | G06F 16/243 |
| 2024/0403568 | A1 * | 12/2024 | Øhrn | G06F 40/40 |

OTHER PUBLICATIONS

"U.S. Appl. No. 18/241,487, Response filed Jun. 17, 2024 to Non Final Office Action mailed May 20, 2024", 12 pgs.
"European Application Serial No. 24196708.2, Extended European Search Report mailed Jan. 21, 2025", 7 pgs.
"International Application Serial No. PCT/US2024/060544, International Search Report mailed Mar. 24, 2025", 3 pgs.
"International Application Serial No. PCT/US2024/060544, Written Opinion mailed Mar. 24, 2025", 6 pgs.
"European Application Serial No. 24196708.2, Response filed Aug. 21, 2025 to Extended European Search Report mailed Jan. 21, 2025", 15 pgs.

* cited by examiner

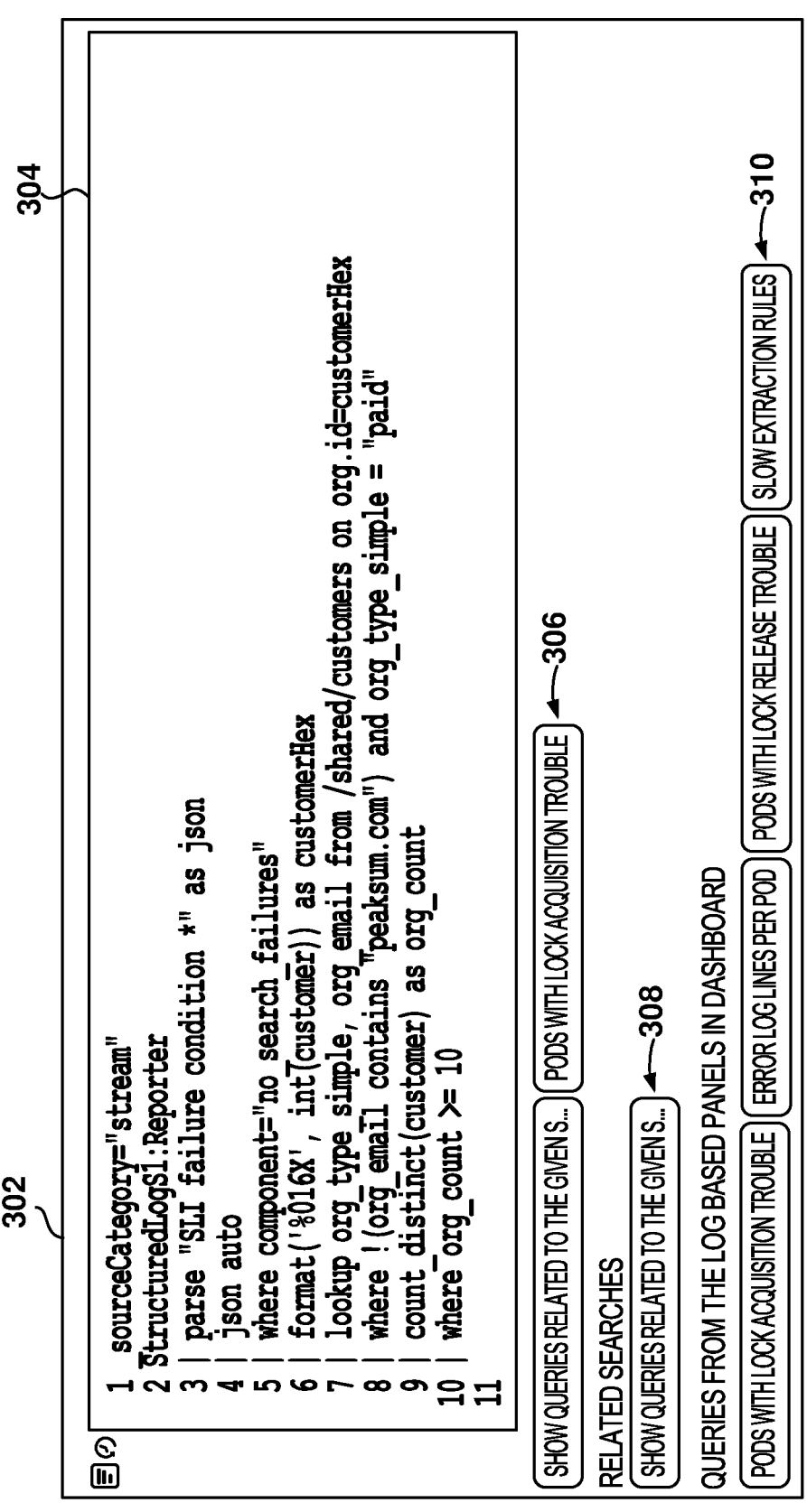

302

304

```
 1  sourceCategory="stream"
 2  StructuredLogSl:Reporter
 3  | parse "SLI failure condition *" as json
 4  | json auto
 5  | where component="no search failures"
 6  | format('%016X', int(customer)) as customerHex
 7  | lookup org_type_simple, org_email from /shared/customers on org.id=customerHex
 8  | where !(org_email contains "peaksum.com") and org_type_simple = "paid"
 9  | count_distinct(customer) as org_count
10  | where org_count >= 10
11
```

SHOW QUERIES RELATED TO THE GIVEN S...    PODS WITH LOCK ACQUISITION TROUBLE    306

RELATED SEARCHES

SHOW QUERIES RELATED TO THE GIVEN S...    308

QUERIES FROM THE LOG BASED PANELS IN DASHBOARD

PODS WITH LOCK ACQUISITION TROUBLE    ERROR LOG LINES PER POD    PODS WITH LOCK RELEASE TROUBLE    SLOW EXTRACTION RULES    310

AWS/WAF    ⌄  ASK SOMETHING...

CLIENT IPS WITH SUSPECTED SQL INJECTION ACTIVITY FOR THE AWS WAF APPLIANCE FOR THE LAST 1 HOUR:  ⌄  [⊞]  👍  ⌫  ⋮

| TIMESTAMP | CLIENT IP | CLIENT IP | 706 ⟶ TARGETED URI |
|---|---|---|---|
| 05/09/2023 8:05:12 AM | 192.0.2.0 | 'OR '1'='1'; -- | /COFFEE-BAR/ORDER |
| 05/09/2023 8:21:43 AM | 192.0.2.1 | 'OR 'A'='A'; | /COFFEE-BAR/REVIEWS |
| 05/09/2023 10:13:39 AM | 203.0.113.0 | '; DROP TABLE MEMBERS; -- | /COFFEE-BAR/LOCATIONS |
| 05/09/2023 10:13:48 AM | 203.0.113.1 | 'OR '2'='2'; -- | /COFFEE-BAR/CONTACT |
| 05/09/2023 10:57:16 AM | 198.51.100.0 | 'OR '0'!='1'; -- | /COFFEE-BAR/MENU |

SUGGESTIONS ⟵ 708

ACT    ⟵ 710

[BLOCK IPS]  [ENRICH IPS WITH THREAT ASSESSMENT]

REFINE    ⟵ 711
CLIENT IPS WITH SUSPECTED XSS ACTIVITY
IP & URI FOR BLOCKED REQUESTS
ACTION COUNT BY IP ADDRESS
ACTION COUNT BY URL
ACTION COUNT BY TERMINATING RULE ID

EXPLORE    ⟵ 712
AUTHENTICATION ACTIVITY BY REGION
LATEST USER SESSIONS
TOP 25 CLIENT IPS BY INCOMING REQUESTS
TOP 25 LOG SOURCES BY VOLUME
TOP 25 LOG SOURCES BY ERRORS
TOP 25 SLOWEST TRACES
TOP 25 TRACES BY ERRORS
AWS ACTIVITY BY REGION
AWS COST BY REGION

[ADD MORE LOG SOURCES]

Figure 8:
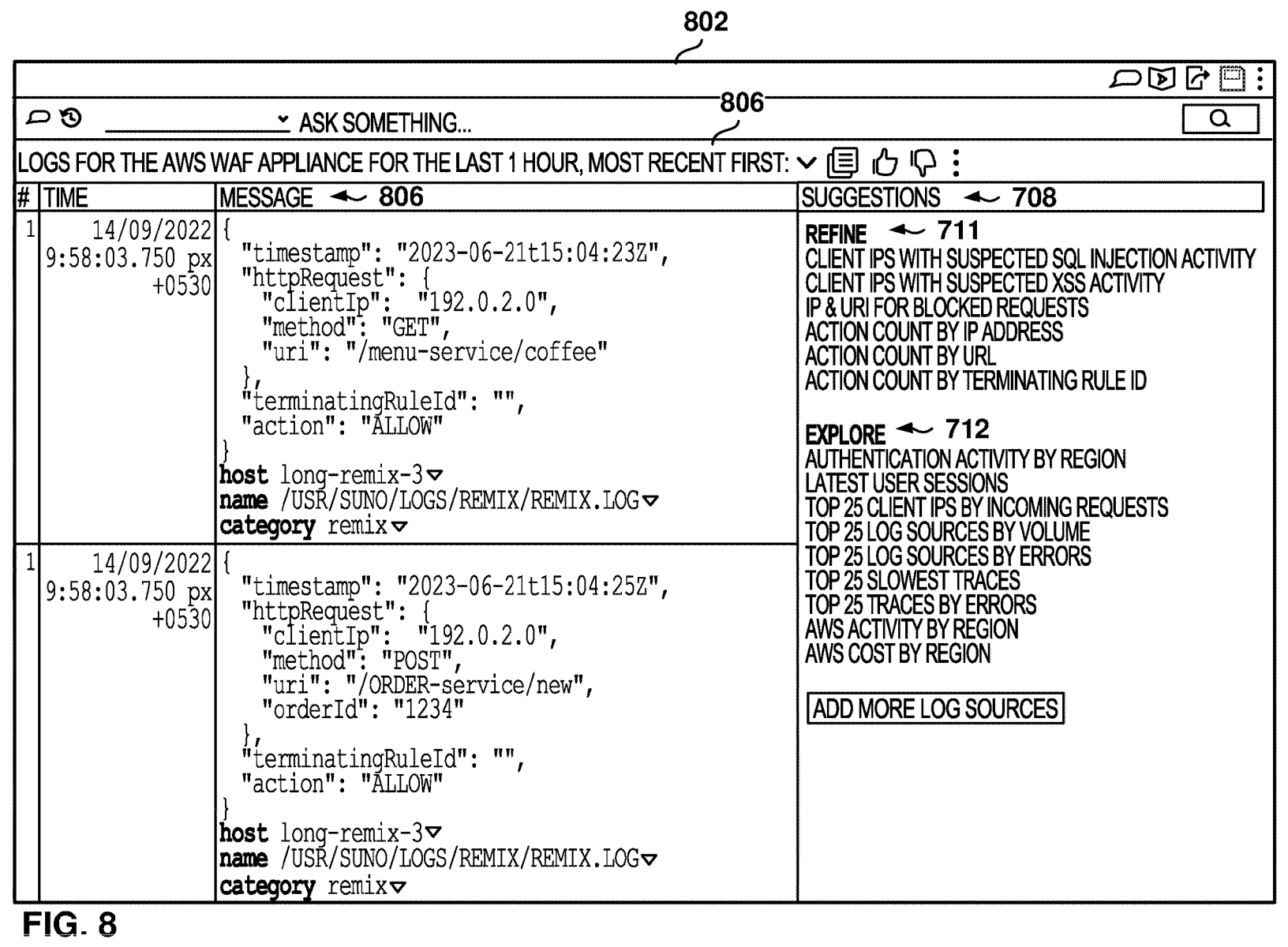

▾ ASK SOMETHING...

LOGS FOR THE AWS WAF APPLIANCE FOR THE LAST 1 HOUR, MOST RECENT FIRST: ▾

SUGGESTIONS ← 708

REFINE ← 711
CLIENT IPS WITH SUSPECTED SQL INJECTION ACTIVITY
CLIENT IPS WITH SUSPECTED XSS ACTIVITY
IP & URI FOR BLOCKED REQUESTS
ACTION COUNT BY IP ADDRESS
ACTION COUNT BY URL
ACTION COUNT BY TERMINATING RULE ID

EXPLORE ← 712
AUTHENTICATION ACTIVITY BY REGION
LATEST USER SESSIONS
TOP 25 CLIENT IPS BY INCOMING REQUESTS
TOP 25 LOG SOURCES BY VOLUME
TOP 25 LOG SOURCES BY ERRORS
TOP 25 SLOWEST TRACES
TOP 25 TRACES BY ERRORS
AWS ACTIVITY BY REGION
AWS COST BY REGION

ADD MORE LOG SOURCES

| # | TIME | MESSAGE ← 806 |
|---|------|---------|
| 1 | 14/09/2022 9:58:03.750 px +0530 | `{`<br>`"timestamp": "2023-06-21t15:04:23Z",`<br>`"httpRequest": {`<br>`"clientIp": "192.0.2.0",`<br>`"method": "GET",`<br>`"uri": "/menu-service/coffee"`<br>`},`<br>`"terminatingRuleId": "",`<br>`"action": "ALLOW"`<br>`}`<br>host long-remix-3▷<br>name /USR/SUNO/LOGS/REMIX/REMIX.LOG▷<br>category remix▷ |
| 1 | 14/09/2022 9:58:03.750 px +0530 | `{`<br>`"timestamp": "2023-06-21t15:04:25Z",`<br>`"httpRequest": {`<br>`"clientIp": "192.0.2.0",`<br>`"method": "POST",`<br>`"uri": "/ORDER-service/new",`<br>`"orderId": "1234"`<br>`},`<br>`"terminatingRuleId": "",`<br>`"action": "ALLOW"`<br>`}`<br>host long-remix-3▷<br>name /USR/SUNO/LOGS/REMIX/REMIX.LOG▷<br>category remix▷ |

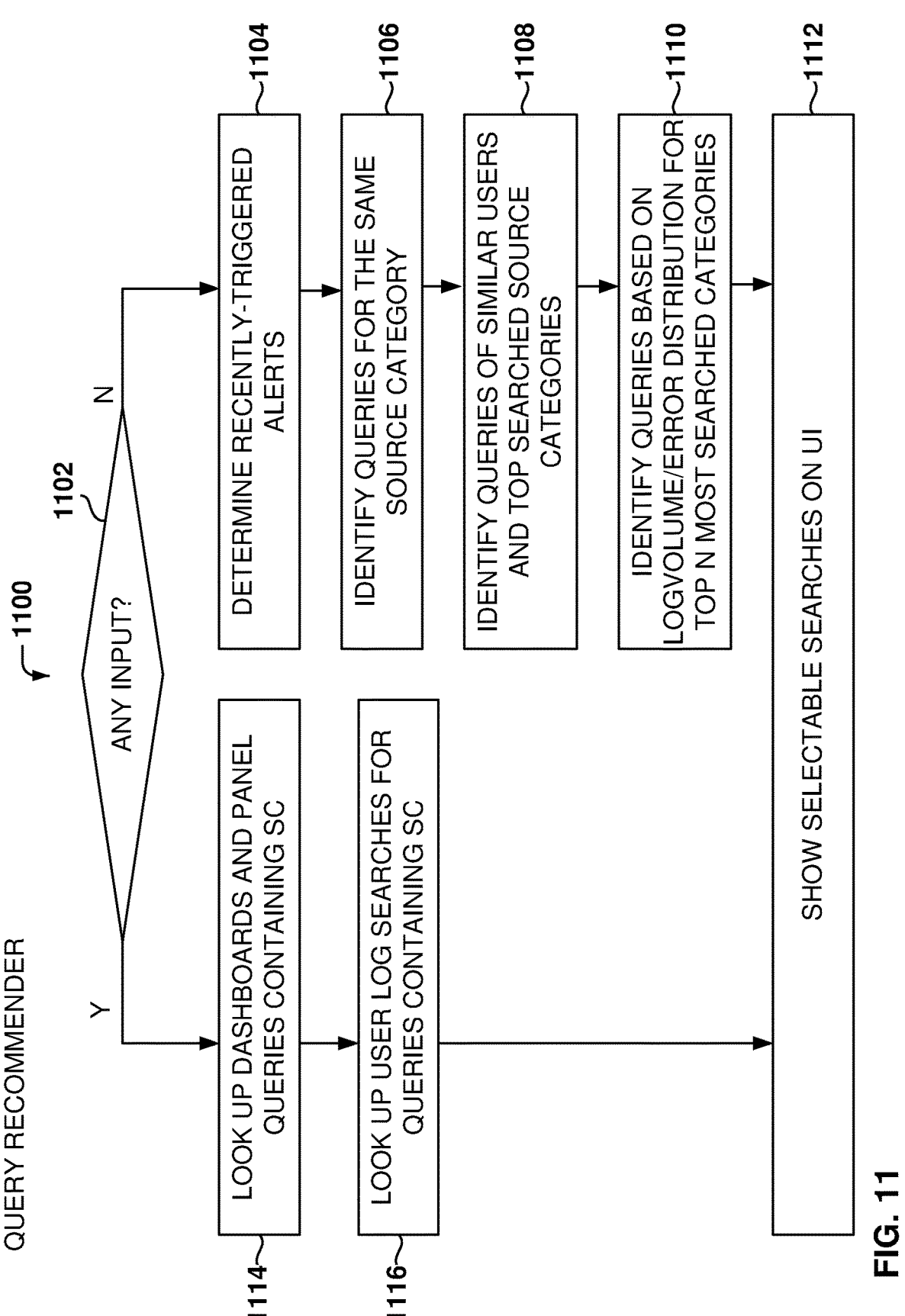

QUERY RECOMMENDER

1100

1102    ANY INPUT?

Y

N

1114    LOOK UP DASHBOARDS AND PANEL QUERIES CONTAINING SC

1116    LOOK UP USER LOG SEARCHES FOR QUERIES CONTAINING SC

1104    DETERMINE RECENTLY-TRIGGERED ALERTS

1106    IDENTIFY QUERIES FOR THE SAME SOURCE CATEGORY

1108    IDENTIFY QUERIES OF SIMILAR USERS AND TOP SEARCHED SOURCE CATEGORIES

1110    IDENTIFY QUERIES BASED ON LOGVOLUME/ERROR DISTRIBUTION FOR TOP N MOST SEARCHED CATEGORIES

1112    SHOW SELECTABLE SEARCHES ON UI

IDENTIFY TRAINING SET ~1202

BREAK TEXT AND QUERIES INTO PHRASES ~1204

VECTORIZE PHRASES ~1206

CALCULATE INNER PRODUCT BETWEEN VECTORIZED INPUT AND TRAINED MATRIX ~1208

UPDATE SCORES OF MATCHED RESULTS BASED ON WEIGHTS ~1210

PRESENT TOP N RESULTS ~1212

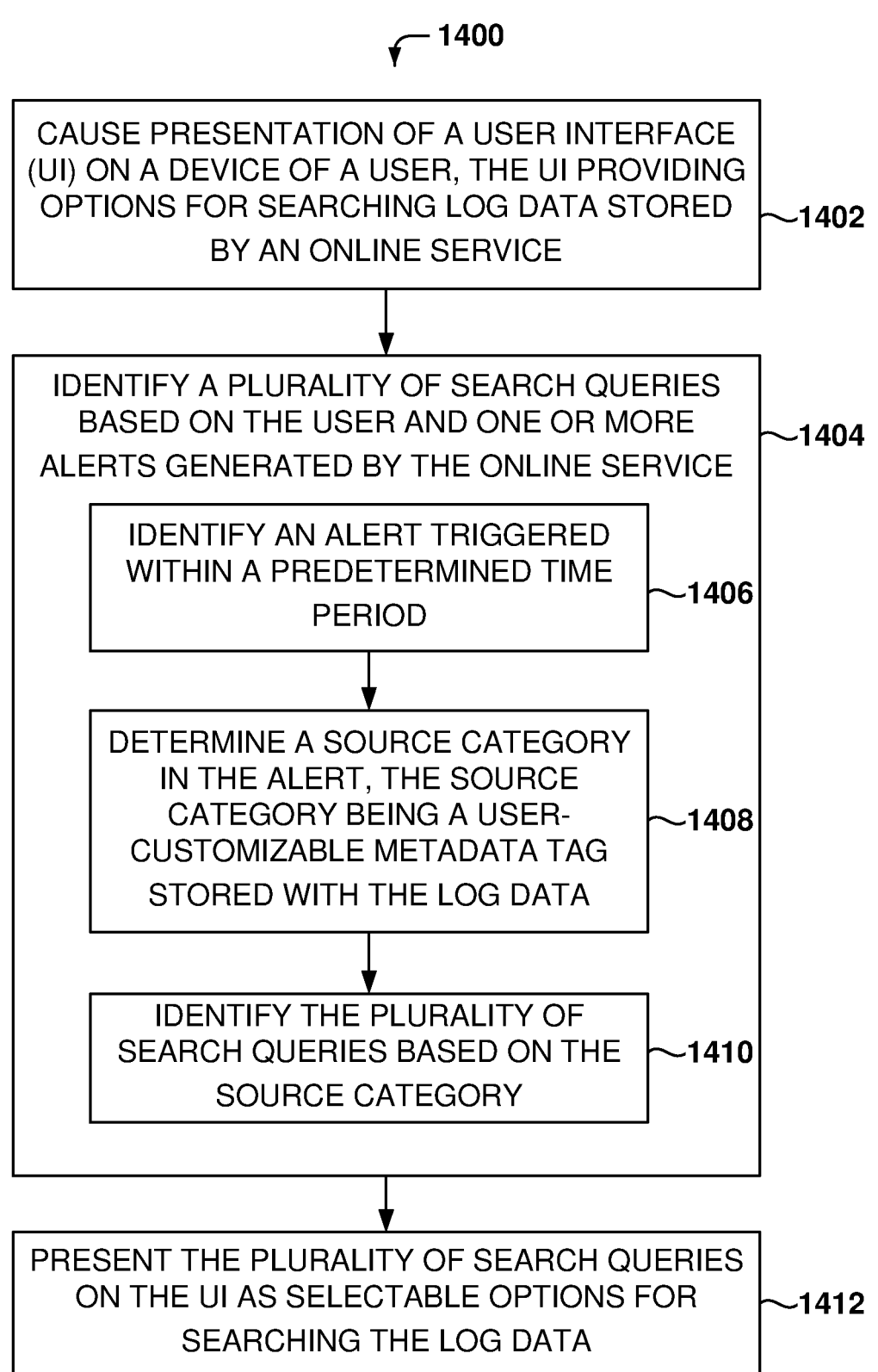

CAUSE PRESENTATION OF A USER INTERFACE (UI) ON A DEVICE OF A USER, THE UI PROVIDING OPTIONS FOR SEARCHING LOG DATA STORED BY AN ONLINE SERVICE ~1402

IDENTIFY A PLURALITY OF SEARCH QUERIES BASED ON THE USER AND ONE OR MORE ALERTS GENERATED BY THE ONLINE SERVICE ~1404

IDENTIFY AN ALERT TRIGGERED WITHIN A PREDETERMINED TIME PERIOD ~1406

DETERMINE A SOURCE CATEGORY IN THE ALERT, THE SOURCE CATEGORY BEING A USER-CUSTOMIZABLE METADATA TAG STORED WITH THE LOG DATA ~1408

IDENTIFY THE PLURALITY OF SEARCH QUERIES BASED ON THE SOURCE CATEGORY ~1410

PRESENT THE PLURALITY OF SEARCH QUERIES ON THE UI AS SELECTABLE OPTIONS FOR SEARCHING THE LOG DATA ~1412

FIG. 14

DETERMINE SUGGESTIONS AND AUTOMATICALLY
EXECUTE QUERIES OF INTEREST

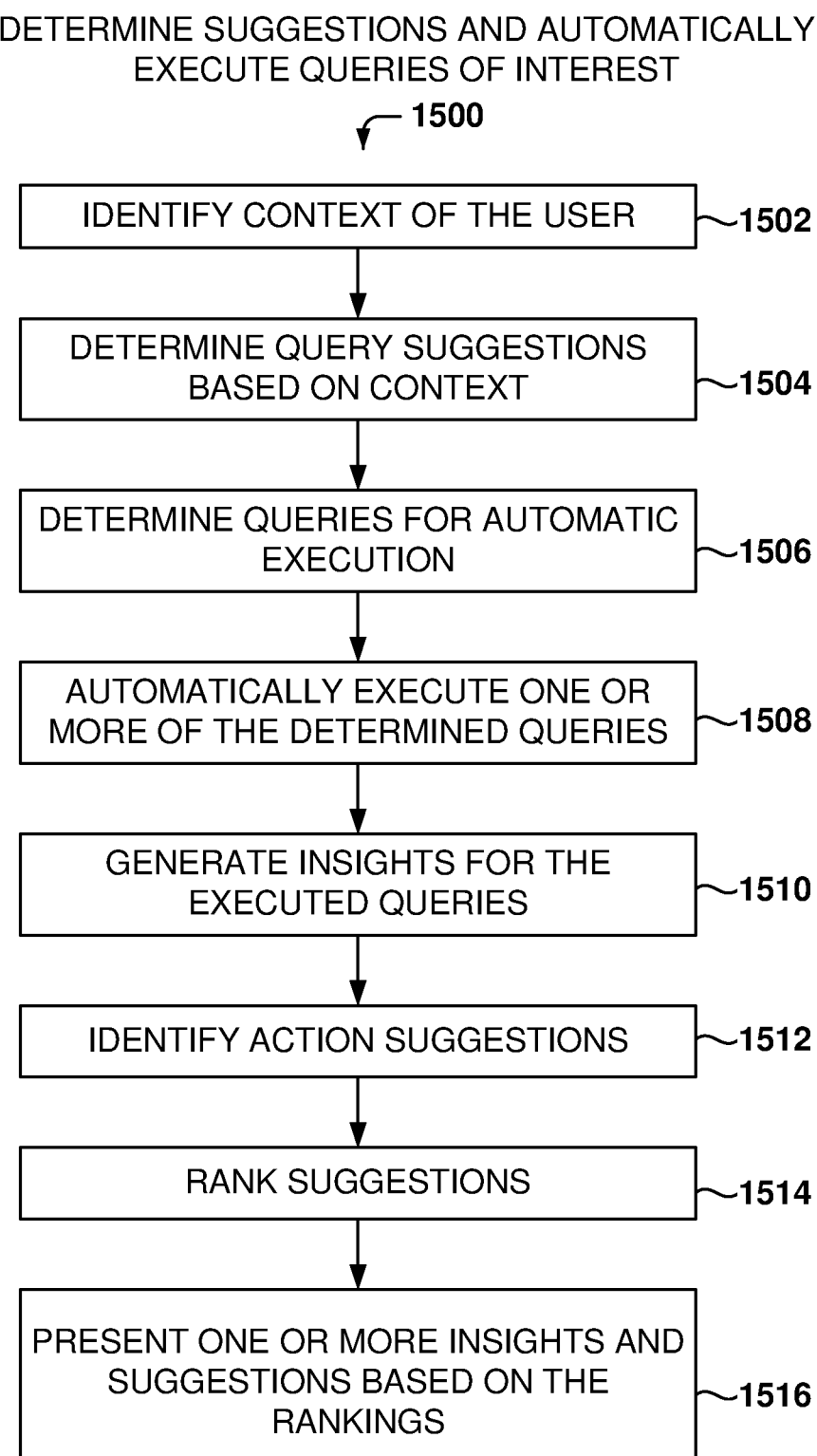

┌─ 1500

IDENTIFY CONTEXT OF THE USER ∼1502

DETERMINE QUERY SUGGESTIONS
BASED ON CONTEXT ∼1504

DETERMINE QUERIES FOR AUTOMATIC
EXECUTION ∼1506

AUTOMATICALLY EXECUTE ONE OR
MORE OF THE DETERMINED QUERIES ∼1508

GENERATE INSIGHTS FOR THE
EXECUTED QUERIES ∼1510

IDENTIFY ACTION SUGGESTIONS ∼1512

RANK SUGGESTIONS ∼1514

PRESENT ONE OR MORE INSIGHTS AND
SUGGESTIONS BASED ON THE
RANKINGS ∼1516

FIG. 15

DETERMINE QUERIES OF INTEREST USING LLM

1800

IDENTIFY, BY A DATA COLLECTION AND ANALYSIS PLATFORM (DCAP), A CONTEXT OF A USER WHILE THE DCAP IS PROVIDING A USER INTERFACE (UI) ON A DEVICE ASSOCIATED WITH THE USER, THE CONTEXT CONTAINING VALUES OF ENVIRONMENTAL PARAMETERS ASSOCIATED WITH THE USER ~1802

DETERMINE A PLURALITY OF QUERIES BASED ON THE CONTEXT OF THE USER ~1804

SELECT ONE OR MORE AUTOMATIC QUERIES, FROM THE PLURALITY OF QUERIES, FOR AUTOMATIC EXECUTION WITHOUT REQUIRING A USER REQUEST TO PERFORM THE ONE OR MORE AUTOMATIC QUERIES ~1806

AUTOMATICALLY EXECUTE THE ONE OR MORE AUTOMATIC QUERIES BY THE DCAP ~1808

GENERATE INSIGHTS BASED ON RESULTS FROM THE EXECUTION OF THE ONE OR MORE AUTOMATIC QUERIES ~1810

CAUSE PRESENTATION IN THE UI OF THE GENERATED INSIGHTS AND ONE OR MORE QUERIES SELECTED FROM THE PLURALITY OF QUERIES. ~1812

FIG. 18

PROACTIVE DETERMINATION OF DATA INSIGHTS

CROSS-REFERENCE TO RELATED APPLICATIONS

This application is a Continuation-in-part Application of U.S. patent application Ser. No. 18/241,487, entitled "Dynamic Query Recommender," filed on Sep. 1, 2023, and is herein incorporated by reference in its entirety.

TECHNICAL FIELD

The subject matter disclosed herein generally relates to methods, systems, and machine-readable storage media for performing proactive analysis of system environments to assist in problem resolution.

BACKGROUND

In the realm of production and security incident management, users often encounter complex systems that require them to manually sift through vast amounts of data to identify and resolve issues. Traditional systems necessitate users to formulate precise queries to obtain insights, which can be time-consuming and may not always yield the desired information, especially for users who may not be well-versed in query languages or the intricacies of the system. Furthermore, once an issue is identified, users must determine the appropriate remediation steps, which adds to the complexity and resolution time. Existing solutions lack the ability to proactively provide users with direct answers, contextual insights, and automated remediation suggestions based on the user's specific role and interaction history.

BRIEF DESCRIPTION OF THE DRAWINGS

Various of the appended drawings merely illustrate examples of the present disclosure and cannot be considered as limiting its scope.

FIG. 3 is a UI of a log-search tool that includes the selected query, according to some examples.

FIG. 4 shows results from a log search, according to some examples.

FIG. 7 is a UI with suggestions and recommendations for problem diagnosis, according to some examples.

FIG. 8 is a UI showing an automatically executed query, according to some examples.

FIG. 9 illustrates an interface for querying time series, according to some examples.

FIG. 11 is a flowchart of a method for generating query recommendations, according to some examples.

FIG. 14 is a flowchart of a method for recommending one or more queries to search log information, according to some examples.

FIG. 15 is a flowchart of a method for the automatic execution of queries, according to some examples.

FIG. 18 is a flowchart of a method for providing contextual suggestions and automated responses to users managing incidents within production or security environments, according to some examples.

DETAILED DESCRIPTION

Figure 1:
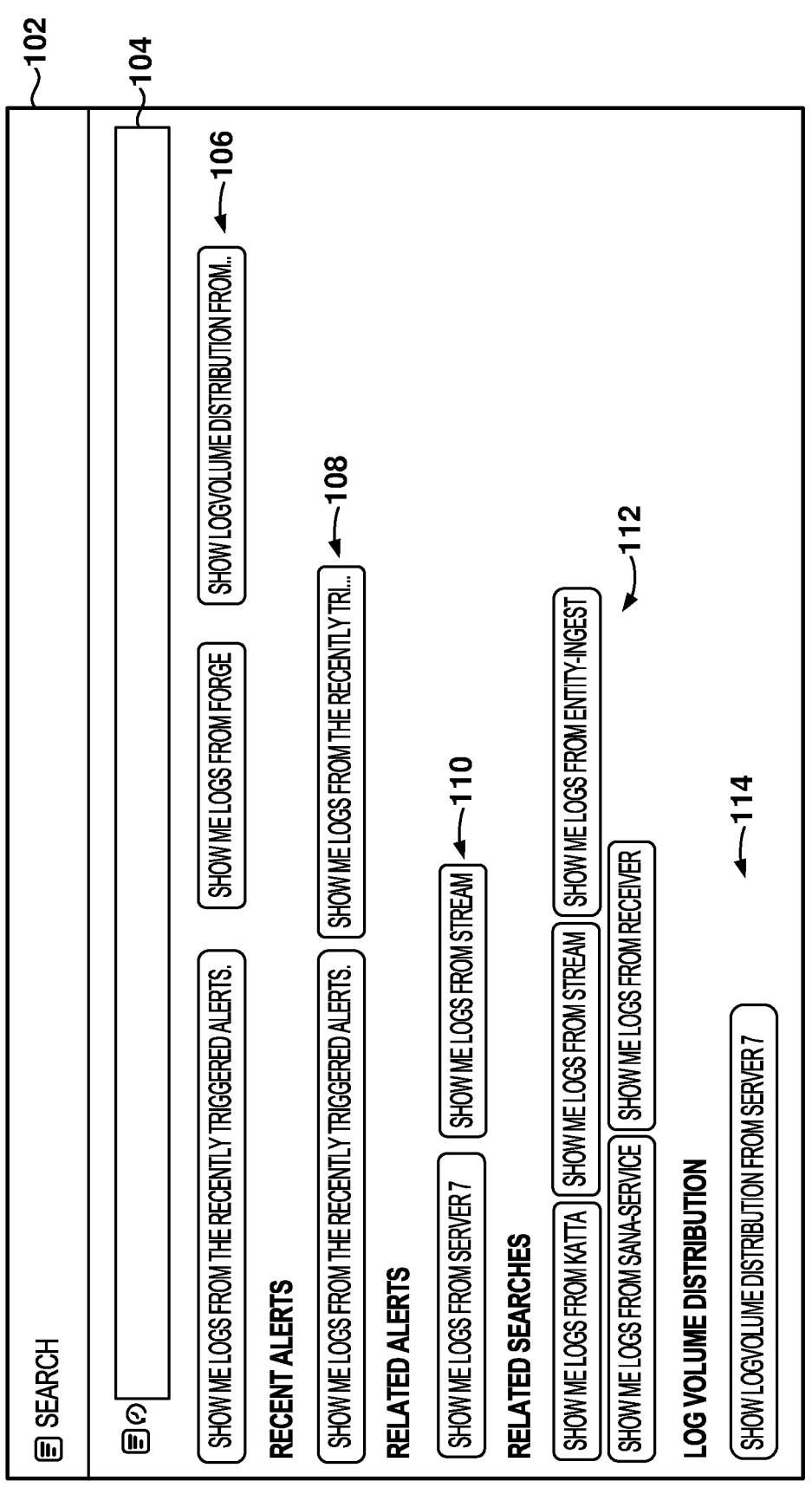
FIG. 1 shows a user interface (UI) for searching logs, according to some examples.

Example methods, systems, and computer programs are directed to recommending a query to search log information. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of examples. It will be evident to one skilled in the art, however, that the present subject matter may be practiced without these specific details.

The disclosed examples relate to a system and method for enhancing user interaction with a software platform, specifically in the context of a log analysis tool. The system aims to provide users with useful insights and recommendations based on their specific needs and queries. The system may use the context of the user, which includes information about the user activities (e.g., recent alerts) and the user configuration in the system (e.g., applications configured by the user in the system) to provide recommendations for searches.

When a user is new to the system, there may not be enough information (e.g., enough "context") to provide good recommendations. In this case, the system determines the context based on the activities of other users, such as more experienced users that are from the same company, or even expands to other users of the system, even if they are from different companies, based on the type of problem (e.g., alert) being troubleshot.

The system utilizes a combination of techniques, including suggested searches, autocomplete functionality, and natural language processing, to assist users in formulating queries and finding relevant information. The autocomplete feature suggests potential queries and analyses based on the user's input, leveraging existing data sets, dashboards, and saved searches within the platform. This helps users quickly find the information they need without having to construct complex queries manually.

In one aspect, the system employs a natural language processing model, e.g., a fine-tuned transformer model, to convert user input expressed in natural language into executable queries. This model is trained on a dataset consisting of pairs of natural language expressions and corresponding queries.

The system also considers the user's past interactions, including their search history, saved dashboards, and alerts, to personalize the recommendations and provide more relevant insights. Additionally, the system leverages metadata, such as source categories used as log metadata, to further refine the recommendations and provide a more tailored user experience.

The disclosed system and method offer several advantages, including improved user productivity, enhanced data exploration capabilities, and increased efficiency in finding valuable insights from large volumes of log data. By leveraging the autocomplete functionality, natural language processing, and personalized recommendations, the system aims to simplify the user experience and enable users to quickly and effectively analyze log data.

A data collection and analysis platform (DCAP), also referred to here as the system, intelligently identifies and presents relevant information to users regarding their specific incidents and provides curated suggestions based on user data and interactions with the DCAP. The DCAP presents automation to the concept of playbooks, leveraging a recommendation engine that considers user preferences and patterns of similar users to broaden recommendations. The DCAP analyzes the status and current state of relevant data sources, including active alerts, to identify potential issues or anomalies.

In one aspect, pre-canned questions and pre-authored queries are used to simplify the data analysis process for users. In some examples, a large language model (LLM) is used to generate suggested actions, and a machine-learning ranking system is used to prioritize which automated actions to perform.

One general aspect includes a computer-implemented method that includes an operation for causing the presentation of a user interface (UI) on a device of a user, the UI providing options for searching log data stored by an online service. The method further includes identifying a plurality of search queries based on the user and one or more alerts generated by the online service. Identifying the plurality of search queries comprises identifying an alert triggered within a predetermined time period, determining a source category in the alert, the source category being a user-customizable metadata tag stored with the log data, and identifying the plurality of search queries based on the source category. The method further includes an operation for presenting the plurality of search queries on the UI as selectable options for searching the log data.

One aspect includes a computer-implemented method that includes an operation for identifying, by a data collection and analysis platform (DCAP), the context of a user while the DCAP provides a user interface (UI) on a device associated with the user, the context containing values of environmental parameters associated with the user. The method further includes operations for determining a plurality of queries based on the context of the user, and for selecting one or more automatic queries, from the plurality of queries, for automatic execution without requiring a user request to perform the one or more automatic queries. The method further includes automatically executing the one or more automatic queries by the DCAP, generating insights based on results from the execution of the one or more automatic queries, and causing presentation in the UI of the generated insights and one or more queries selected from the plurality of queries.

FIG. 1 shows a user interface (UI) 102 for searching logs, according to some examples. In some examples, recommendations on search queries are provided to the user based on the situation of the user. For example, as the user selects different searches, additional, more detailed, related search queries are presented.

The suggestions are particularly helpful for users who are new to the system, and one objective is to provide these users with valuable insights promptly. Another goal is to let users interact with the system using natural language without having to create complex queries to sort the data.

In some examples, suggestions are provided based on the input provided for a query to search logs. In another example, search queries are suggested as the user enters text in the search field. Further, in another example, queries are generated based on the user input and knowledge about the user and other users of the same company.

In the illustrated example, the user is investigating an alert. The UI 102 provides a search field 104 and a plurality of natural-language search queries that include common search queries 106 (e.g., "Show me logs from recently triggered alerts"), recent-alert queries 108 (e.g., "Show me logs from recently triggered alerts"), related-alert queries 110 (e.g., "Show me logs from server 7"), related-search queries 112 (e.g., "Show me logs from stream"), and log-volume-distribution query 114 (e.g., "Show logVolume distribution from server 7"). It is noted that the example illustrated in FIG. 1 is an example and does not describe every possible example. The example illustrated in FIG. 1, should therefore not be interpreted to be exclusive or limiting, but rather illustrative.

For example, the user may be investigating a transmission of cloud trail logs to the system. The system analyzes these logs and identifies something of interest or something unusual within these logs. These findings are then presented as results to the user, even without a specific request from them. If the user is not satisfied with the presented results, they have the option to request other insights from the system in plain English based on related search queries. The system analyzes many factors, as described in more detail below, such as queries submitted by the user in the past, queries submitted by other users in the past in a similar scenario, queries suggested by the system based on recent log activity, etc. The system then generates query suggestions to allow the user to navigate by using more and more specific search queries to identify the most relevant data to diagnose the problem.

Figure 2:
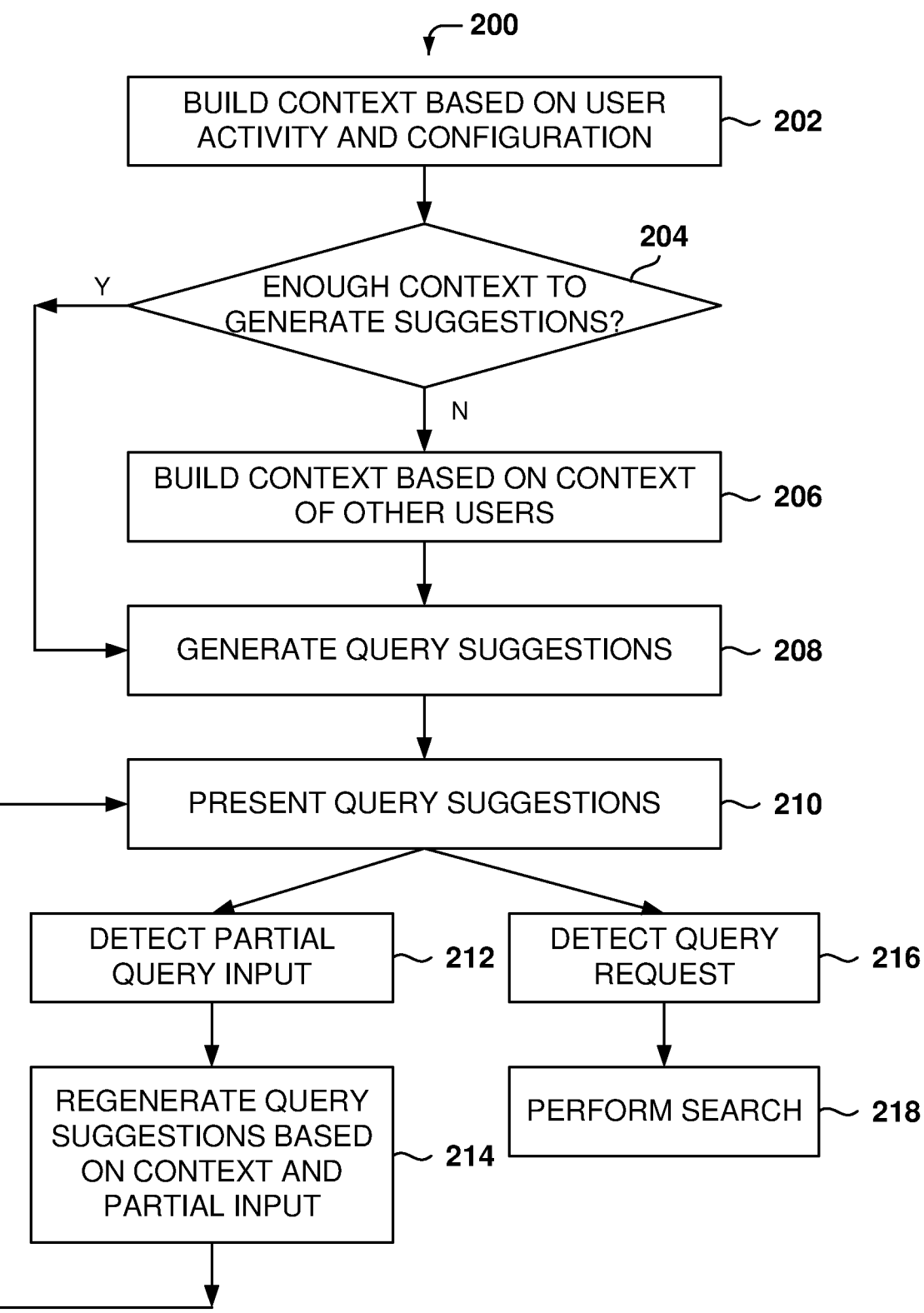
FIG. 2 is a flowchart of a method for providing search assistance based on the user's context, according to some examples.

FIG. 2 is a flowchart of a method 200 for providing search assistance based on user's context, according to some examples. The purpose is to make it easier for the user to search and troubleshoot problems. The system may use the context of the user, which includes information about the user activities (e.g., recent alerts) and the user configuration in the system (e.g., applications configured by the user in the system) to provide recommendations for searches.

When a user is new to the system, there may not be enough information (e.g., enough "context") to provide good recommendations. In this case, the system determines the context based on the activities of other users, such as more experienced users that are from the same company, or even expands to other users of the system, even if they are from different companies, based on the type of problem (e.g., alert) being troubleshot. The system always protects the privacy of other users (e.g., never using Personal Identifiable Information (PII) data).

At operation 202, the system determines the context of the user accessing the search UI based on the activities of the user and the configuration of the user. The activities of the user include information about actions of the user within a predetermined time period (e.g., last 24 hours, last 48 hours, last week, last month) and includes searches requested by the user, alerts investigated by the user, logs accessed by the user, etc.

The configuration of the user includes any information configured by the user in the service, such as add-in applications used by the user in the service, search queries created by the user, search queries accessed by the user, configured alerts that will notify the user when a problem is detected, etc. Additionally, information that may be used to build the user context is the information the system has about the topology, architecture, and organization of the user application, e.g., configured services that are related to each other. For example, if a userManagement service depends on another service billingAccounts for billing (e.g., to determine if a user account is in good standing for invoices), a user investigating problems with userManagement might be interested in query recommendations about anomalous behavior or error spikes in the billingAccounts service due to the services dependency relationship.

From operation 202, the method 200 flows to operation 204 where a check is made to determine if there is enough context (e.g., enough information) to provide recommendations for the user. For example, if the user is new to the system, there may not be information on past activities to guess what the user may be searching for. If there is enough information in the context, the method 200 flows to operation 208, and when there is not enough context information, the method 200 flows to operation 206.

At operation 206, the system has determined that there is no context for the user, so the user builds a context based on other users of the system. For example, the system looks at other users in the same company as the user to build a context by identifying what kind of searches other users tend to request, responses from other users to alerts that are similar to a recently received alert, etc. The system may also include the context activities from other users of the system (in the same company for a different company) that are performed when investigating a certain type of event (e.g., denial of service attack).

From operation 206, the method 200 flows to operation 208 where query suggestions are generated based on the context information previously identified.

From operation 208, the method 200 flows to operation 210 where the suggestions are presented on the UI of the user. The suggestions may be classified into different categories (e.g., recent alerts, related alerts, related searches, log volume distribution).

From operation 210, the method 200 flows to operation 212 when a partial input of the user is detected in the UI (e.g., the user starts typing a request in natural language. However, when the system detects that the user has submitted a search query, then the method 200 flows to operation 216.

At operation 214, the query suggestions are re-generated based on the input entered by the user and the context, and then the method 200 flows back to operation 210.

At operation 216, the query request is detected, and the method 200 flows to operation 218, where the search is performed, and the results are presented on the UI.

FIG. 3 is a UI 302 of a log-search tool that includes the selected query, according to some examples. In this example, the UI 302 is presented after the user selects the query "Show me logs from recently triggered alerts." The UI 302 includes query 304, natural-language queries 306, related natural-language queries 308, and natural-language queries 310 from the log-based panels in the dashboard.

The query 304 is a complex query with multiple instructions, and this type of query is usually generated by an expert. On the other hand, natural-language queries are descriptive queries in plain language and can be used by expert users as well as novice users.

The search query language is a tool for searching and analyzing log data that uses a variety of operators to perform searches, such as:

Keyword: operator to search for a specific keyword or phrase in the log data. For example, a query with the keyword "error" will search for all log messages that contain the word "error:"

Operators: the operators are used to combine keywords and phrases to create more complex searches. Some common operators are AND (all of the keywords or phrases must be present in the log message, e.g., a query of "error AND 404" will search for all log messages that contain the words "error" and "404"), OR (either of the keywords or phrases can be present in the log message, e.g., "error OR 404" search for log messages that contain the words "error" or "404"), and NOT (the keyword or phrase cannot be present in the log message for the search to return a result, e.g., "NOT error" would search for log messages that do not contain the word "error");

Parse: the operator is used to extract data from the log messages. For example, the query (parse "source_ip=\d{1,3}\.\d{1,3}\.\d{1,3}\.\d{1,3}" as source_ip) will extract the source IP address from all log messages and store the source IP address in a new field called source_ip:

Group: the | operator is used to group the results of a search by a common field, e.g., (source_ip|count) will group the results of the search by the source_ip and count the number of messages in each group; and Top: the top operator is used to return the top N results of a search, e.g., (source_ip|top 10) will return the top 10 results of the search.

If the user selects the query 304, then the query will be executed to search the data. Examples are presented with reference to queries from the company Sumo Logic®, but the same principles may be used for other types of queries and other types of tools.

Figure 4:
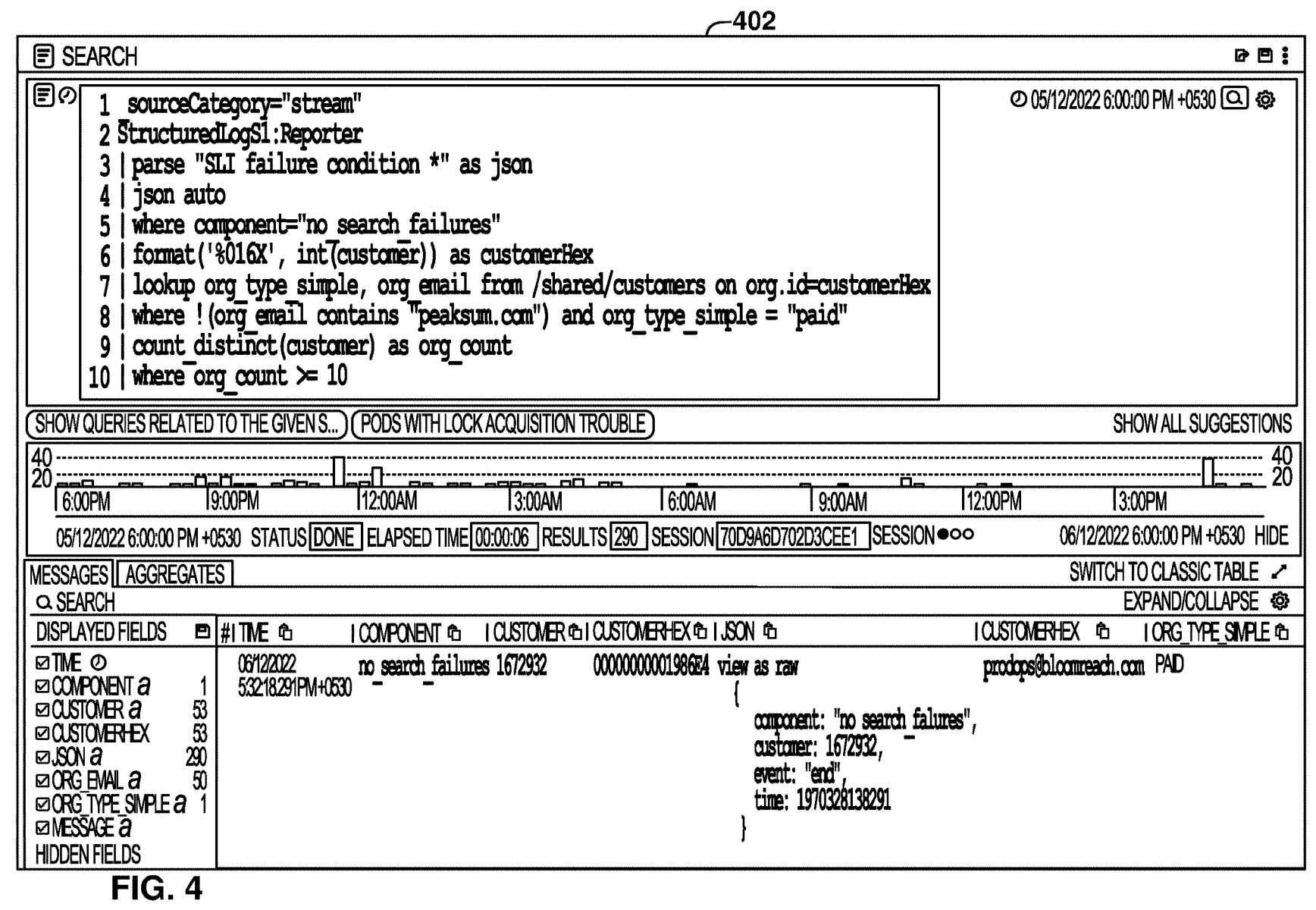

FIG. 4 shows results from a log search, according to some examples. After the user selects the option to execute the query of FIG. 3, the UI 402 is presented, which includes the query that was executed and the results of running the query, such as a histogram of relevant events, and a table with the logs found by executing the query.

Figure 5:
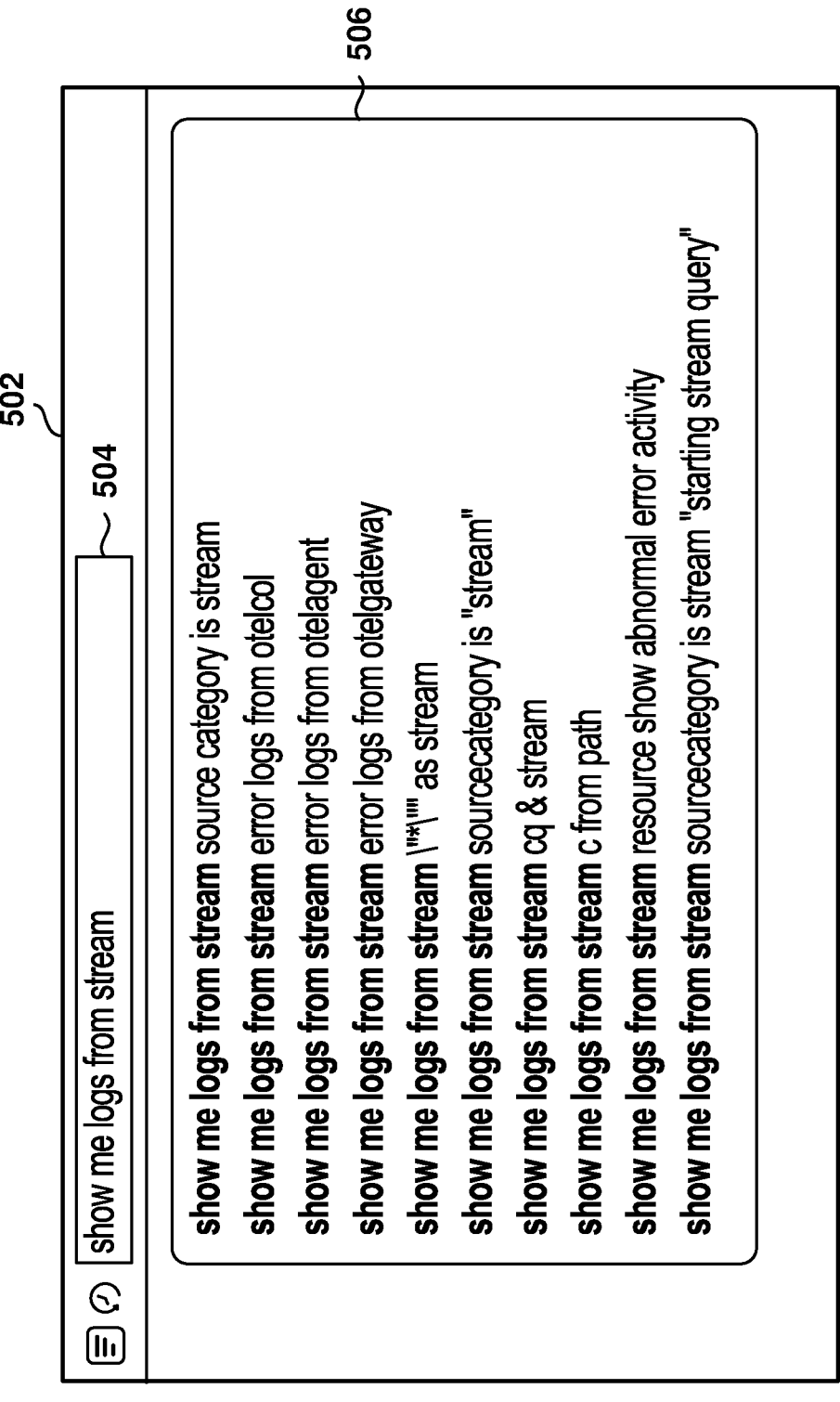
FIG. 5 shows the autocomplete feature while entering a search for logs, according to some examples.

FIG. 5 shows the autocomplete feature while entering a search for logs, according to some examples. In the UI 102 of FIG. 1, the user has selected the natural-language query "Show me logs from stream" in the related-search queries 112. In response, the system presents UI 502 with search field 504 including the beginning of the recommended query, e.g., "Show me logs from stream."

The UI 502 further a list of autocomplete suggestions 506 with recommendations of some of the possible search queries, e.g., "Show me logs from stream sourcecategory is stream," "Show me logs from stream error logs from otelcol," "Show me logs from stream error logs from otelagent," etc.

The user may continue typing in the search field 504 or select one of the queries in the list of autocomplete suggestions 506. In this example, the user adds to the search field 504 "where callermodule," and the search field 504 is now "Show me logs from stream where callermodule."

In response, the list of autocomplete suggestions 506 is updated with the following options:

> Show me logs from the stream where callermodule is "report":
> Show me logs from the stream where callermodule is not "optimizeit":
> Show me logs from the stream where callermodule is *:
> Show me logs from the stream where callermodule matches
> Show me logs from the stream where callermodule is "api":
> Show me logs from the stream where callermodule error logs from otelcol:
> Show me logs from the stream where callermodule error logs from otelagent:
> Show me logs from the stream where callermodule error logs from otelgateway; and
> Show me logs from the stream where callermodule is "subquery".

Again, the user may continue typing or select one of the options in the list of autocomplete suggestions 506. The process may continue until the user submits the query or one of the options is selected. In response, the system will perform the requested query and present the results of the query, e.g., the results page of FIG. 4 or FIG. 7.

Thus, the system provides a versatile search query entry with autocomplete that is based on natural language without the requirement that the user is an expert in the logic query language (e.g., Sumo logic query language).

Further, the suggestions presented may be based on recently triggered alerts that are relevant to this user entering the search query, as well as information that similar users (e.g., users working for the same company) have accessed in the past or are currently accessing.

Figure 6:
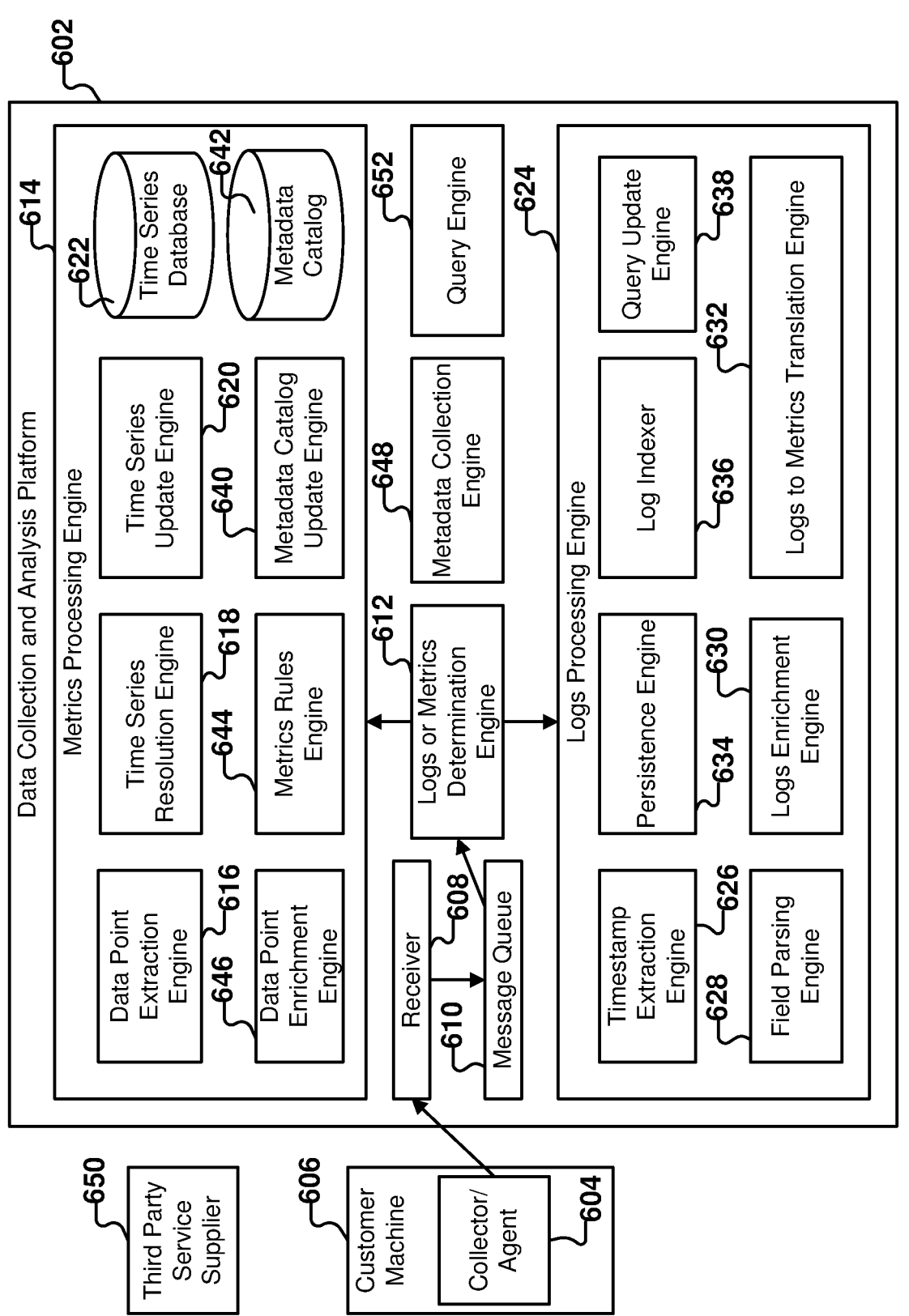
FIG. 6 illustrates an environment in which machine data collection and analysis are performed, according to some examples.

FIG. 6 illustrates an environment in which machine data collection and analysis are performed, according to some examples. The data collection and analysis platform (DCAP 602) (also referred to herein as the "platform" or the "system") is configured to ingest and analyze machine data (e.g., log messages and metrics) collected from customers (e.g., entities utilizing the services provided by the DCAP 602). For example, collectors (e.g., collector/agent 604 installed on machine 606 of a customer) send log messages to the platform over a network (such as the Internet, a local network, or any other type of network, as appropriate): customers may also send logs directly to an endpoint such as a common HTTPS endpoint. Collectors can also send metrics, and likewise, metrics can be sent in common formats to the HTTPS endpoint directly. In some examples, metrics rules engine 644 is a processing stage (that may be user-guided) that can change existing metadata or synthesize new metadata for each incoming data point.

As used herein, log messages and metrics are but two examples of machine data that may be ingested and analyzed by the DCAP 602 using the techniques described herein. Collector/Agent 604 may also be configured to interrogate machine 606 directly to gather various host metrics such as CPU (central processing unit) usage, memory utilization, etc.

Machine data, such as log data and metrics, are received by receiver 608, which, in some examples, is implemented as a service receiver cluster. Logs are accumulated by each receiver into bigger batches before being sent to message queue 610. In some examples, the same batching mechanism applies to incoming metrics data points as well.

The batches of logs and metrics data points are sent from the message queue to logs or metrics determination engine 612. Logs or metrics determination engine 612 is configured to read batches of items from the message queue and determine whether the next batch of items read from the message queue is a batch of metrics data points or whether the next batch of items read from the message queue is a batch of log messages. For example, the determination of what machine data is log messages or metrics data points is based on the format and metadata of the machine data that is received.

In some examples, a metadata index (stored, for example, as metadata catalog 642 of DCAP 602) is also updated to allow flexible discovery of time series based on their metadata. In some examples, the metadata index is a persistent data structure that maps metadata values for keys to a set of time series identified by that value of the metadata key.

For a collector, there may be different types of sources from which raw machine data is collected. The type of source may be used to determine whether the machine data is logs or metrics. Depending on whether a batch of machine data includes log messages or metrics data points, the batch of machine data will be sent to one of two specialized backends, metrics processing engine 614 and logs processing engine 624, which are optimized for processing log messages and metrics data points, respectively.

When the batch of items read from the message queue is a batch of metrics data points, the batch of items is passed downstream to the metrics processing engine 614. Metrics processing engine 614 is configured to process metrics data points, including extracting and generating the data points from the received batch of metrics data points (e.g., using data point extraction engine 616). Time series resolution engine 618 is configured to resolve the time series for each data point given data point metadata (e.g., metric name, identifying dimensions). Time series update engine 620 is configured to add the data points to the time series (stored in this example in time series database 622) in a persistent fashion.

If logs or metrics determination engine 612 determines that the batch of items read from the message queue is a batch of log messages, the batch of log messages is passed to logs processing engine 624. Logs processing engine 624 is configured to apply log-specific processing, including timestamp extraction (e.g., using timestamp extraction engine 626) and field parsing using extraction rules (e.g., using field parsing engine 628). Other examples of processing include further augmentation (e.g., using logs enrichment engine 630).

The ingested log messages and metrics data points may be directed to respective log and metrics processing backends that are optimized for processing the respective types of data. However, there are some cases in which information that arrived in the form of a log message would be better processed by the metrics backend than the logs backend. Some examples of such information is telemetry data, which includes, for example, measurement data that might be recorded by an instrumentation service running on a device. In some examples, telemetry data includes a timestamp and a value. The telemetry data represents a process in a system. The value relates to a numerical property of the process in question. For example, a smart thermostat in a house has a temperature sensor that measures the temperature in a room on a periodic basis (e.g., every second). The temperature measurement process, therefore, creates a timestamp-value pair every second, representing the measured temperature of that second.

Telemetry may be efficiently stored in, and queried from, a metrics time series store (e.g., using metrics processing engine 614) than by abusing a generic log message store. By doing so, customers utilizing the DCAP 602 can collect host metrics such as CPU usage directly using, for example, a metrics collector. In this case, the collected telemetry is directly fed into the optimized metrics time series store (e.g., provided by the metrics processing engine 614). The system can also, at the collector level, interpret a protocol, such as the common Graphite protocol, and send it directly to the metrics time series storage backend.

As another example, consider a security context in which syslog messages may come in the form of CSV (comma-separated values). However, storing such CSV values as a log would be inefficient, and it should be stored as a time series in order to query that information better. In some examples, although metric data may be received in the form of a CSV text log, the structure of such log messages is automatically detected. The values from the text of the log (e.g., the numbers between the commas) are stored in a data structure such as columns of a table, which better allows for operations such as aggregations of table values or other operations applicable to metrics that may not be relevant to log text.

The logs-to-metrics translation engine 632 is configured to translate log messages that include telemetry data into metrics data points. In some examples, the logs-to-metrics translation engine 632 is implemented as a service. In some examples, upon performing logs-to-metrics translation, if any of the matched logs-to-metrics rules indicates that the log message (from which the data point was derived) should be dropped, the log message is removed. Otherwise, the logs processing engine is configured to continue to batch log messages into larger batches to persist them (e.g., using persistence engine 634) by sending them to an entity such as Amazon S3 for persistence.

The batched log messages are also sent to log indexer 636 (implemented, for example, as an indexing cluster) for full-text indexing and query update engine 638 (implemented, for example, as a continuous query cluster) for evaluation to update streaming queries.

In some examples, once the data points are created in memory, they are committed to persistent storage such that a user can then query the information. In some examples, the process of storing data points includes two distinct parts and one asynchronous process. First, based on identifying metadata, the correct time series is identified, and the data point is added to that time series. In some examples, the time series identification is performed by time series resolution engine 618 of DCAP 602. Secondly, a metadata index is updated in order for users to find time series based on metadata more easily. In some examples, the updating of the metadata index (also referred to herein as a "metadata catalog") is performed by metadata catalog update engine 640.

Thus, the DCAP 602, using the various backends described herein, is able to handle any received machine data in the most native way, regardless of the semantics of the data, where machine data may be represented, stored, and presented back for analysis in the most efficient way. Further, a data collection and analysis system, such as the DCAP 602, has the capability of processing both logs and time series metrics, provides the ability to query both types of data (e.g., using query engine 652), and creates displays that combine information from both types of data visually.

The log messages may be clustered by key schema. Structured log data is received (it may have been received directly in structured form, or extracted from a hybrid log, as described above). An appropriate parser consumes the log, and a structured map of keys to values is output. All of the keys in the particular set for the log are captured. In some examples, the values are disregarded. Thus, for the one message, only the keys have been parsed out. That set of keys then goes into a schema which may be used to generate a signature and used to group the log messages. That is, the signature for logs in a cluster may be computed based on the unique keys the group of logs in the cluster contains. The log is then matched to a cluster based on the signature identifier. In some examples, the signature identifier is a hash of the captured keys. In some examples, each cluster that is outputted corresponds to a unique combination of keys. In some examples, when determining which cluster to include a log in, the matching of keys is exact, where the key schemas for two logs are either the same or different.

In some examples, data point enrichment engine 646 and logs enrichment engine 630 are configured to communicate with metadata collection engine 648 in order to obtain, from a remote entity such as third-party service supplier 650, additional data to enrich metrics data points and log messages, respectively.

FIG. 7 is a UI 702 with suggestions and recommendations for problem diagnosis, according to some examples. Customers used the DCAP seeking answers to production or security incidents. Instead of just waiting for customers to ask questions (e.g., execute script related to an alert that I received), the DCAP provides automatically generated intelligent answers based on the context of their situation. The contextual suggestions can be derived from the data provided by customers and the context in which they are using the DCAP.

For example, the DCAP can present a message indicating, "Here are some possible answers to the problem you are investigating, and here are a few suggestions on what you could do next to solve the problem or gather additional relevant information."

Contextual suggestions are curated from a combination of the data that the user is sending to the DCAP and the context deduced from the user's activities. Thus, the system provides automatic insights and also enables the user to switch to natural language interactions, such as the examples described above with reference to FIGS. 1 and 5.

Additionally, the DCAP may suggest remediation flows based on the user's situation. For example, the response latency of a database has increased rapidly, which may be due to a lack of storage in the database, so the recommendation flows may suggest having more disks in the database.

The UI 702 shows an example where the DCAP has run a query 704 for the client IPs with suspected malicious activity, e.g., "Client IPs with suspected SQL injection activity for the AWS WAF appliance for the last hour." For example, the DCAP 602 has performed this analysis automatically, without a user request, to compare log data to the same hosts the previous day, and the difference is that there are some suspected SQL injection activity clients.

The UI 702 provides a table 706 with a list of the clients and associated information in the different columns, e.g., timestamp, client IP address, client IP query parameters, and targeted Uniform Resource Identifier (URI).

The UI 702 further provides suggestions 708. In some examples, there are three types of suggestions 708: act 710, refine 711, and explore 712. These suggestions 708 aim to enhance the user experience by providing parallel queries, relevant information based on previous actions, and contextual play books for remediation.

Explore 712 presents a list of possible queries that may be of interest to the user based on the user's context.

Refine 711 presents a list of possible queries that are relevant to the information presented in the UI 702, e.g., table 706, which are specifically relevant because they are based on previous actions that other users have taken after looking at a similar problem.

Act 710 includes remedial suggestions based on the current context, such as blocking certain IP addresses or getting additional information on certain IP addresses by performing a threat-assessment analysis, which is an existing playbook in the DCAP 602.

FIG. 8 is a UI 802 showing an automatically executed query 804, according to some examples. The automatically executed query 804 is for "Logs for the AWS WAF appliance for the last hour, most recent first." The details of the executed query are presented in table 806, where each row includes a timestamp and details of the received message (e.g., log).

After the automatically executed query 804 is done, the suggestions 708 are also updated, in this case with new options for refine 711 and explore 712.

Figure 9:
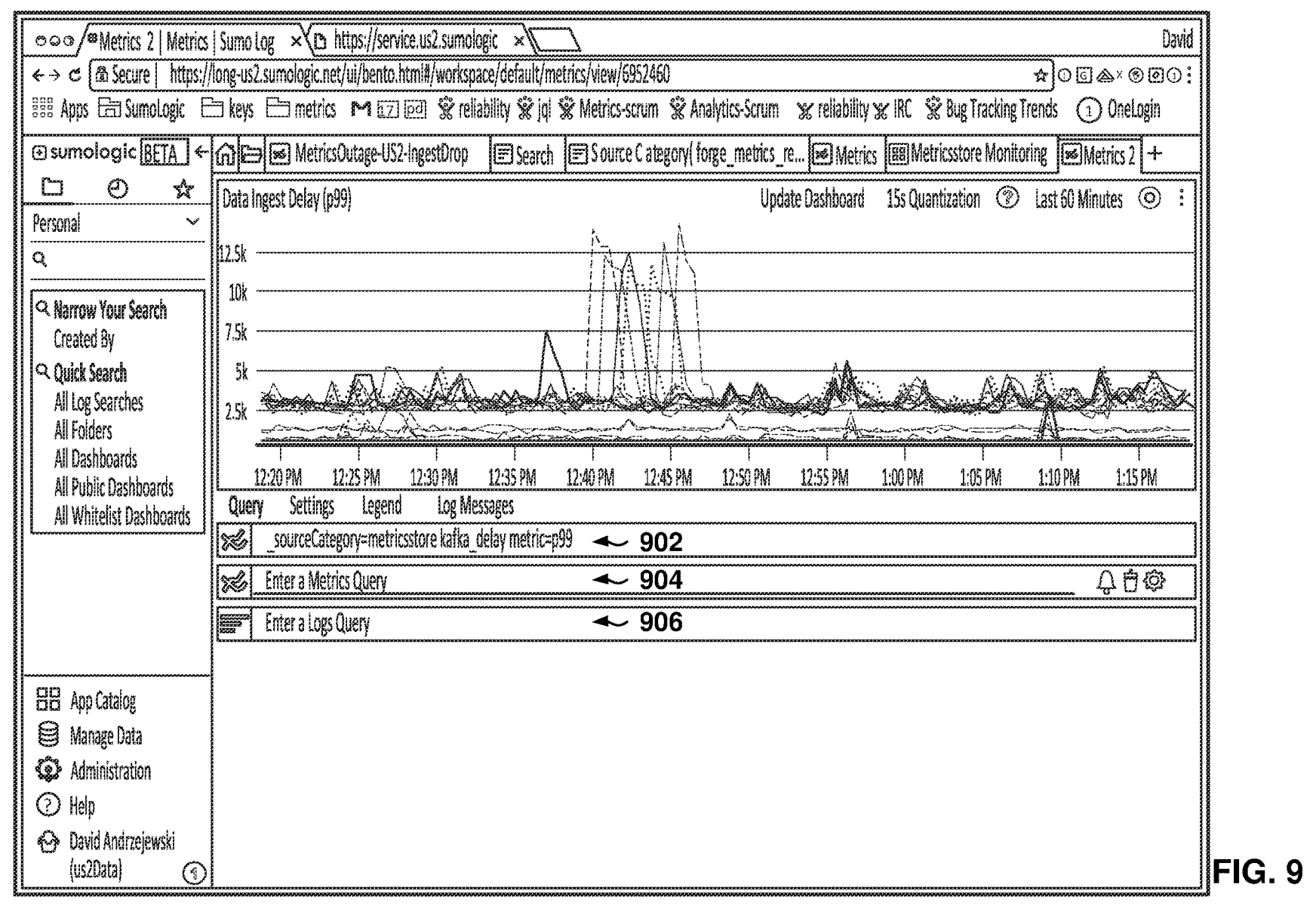

FIG. 9 illustrates some examples of an interface for querying time series, where a user has entered a query. As shown, the user has entered a query 902 for a time series. In this example, the query 902 includes the key values "_sourceCategory=metricsstore" and "kafka_delay metric=p99." Shown also in this dashboard are fields for entering metrics queries 904 and logs queries 906. The user may then enter a logs query 906, and the corresponding logs will be presented, such as the log list presented in FIG. 4.

Figure 10:
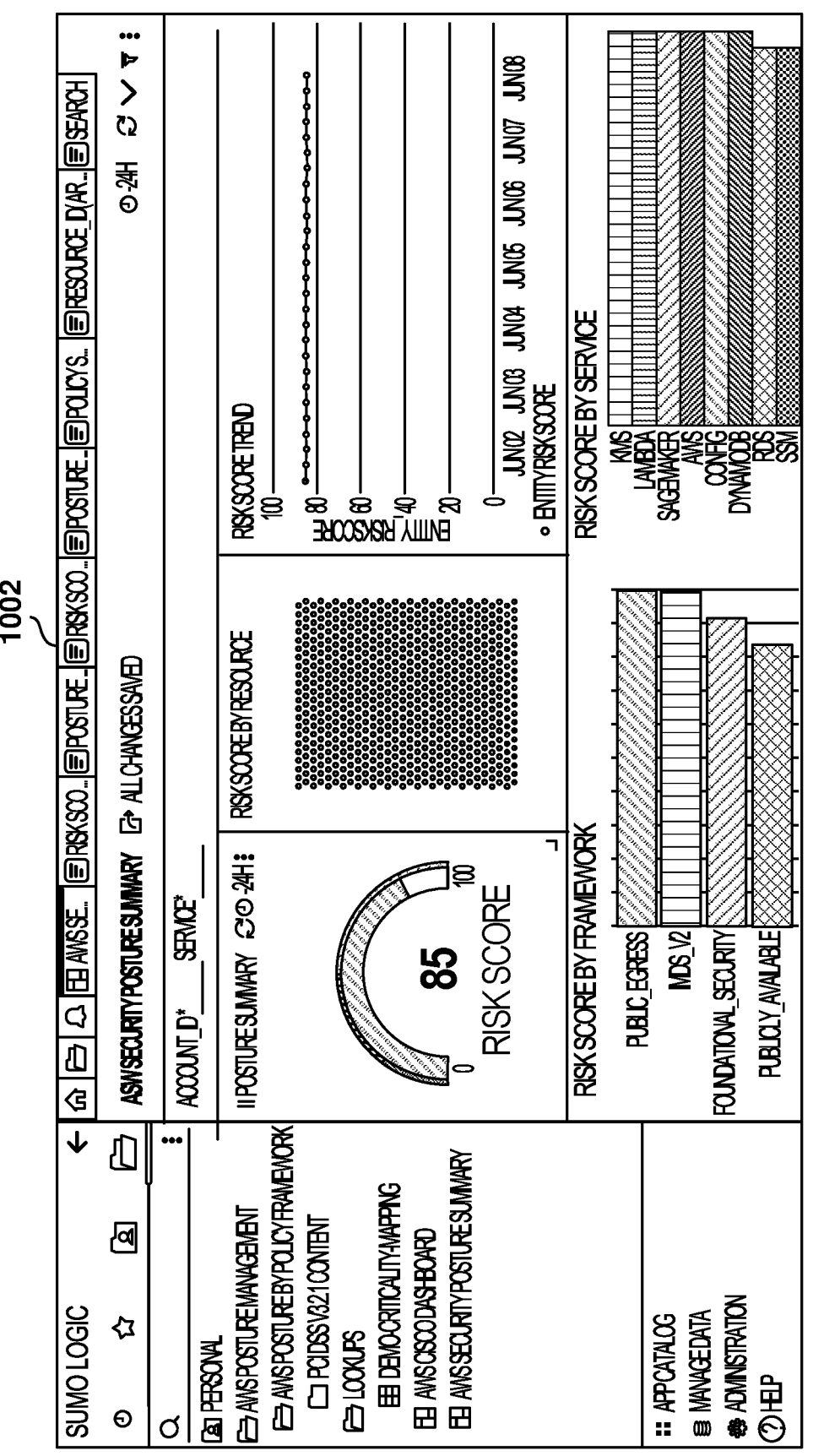
FIG. 10 shows a user-configured dashboard for accessing log information, according to some examples.

FIG. 10 shows a user-configured dashboard 1002 for accessing log information, according to some examples. A dashboard is a visual representation of data and data options that assist the user in monitoring and troubleshooting. The dashboards provided by Sumo Logic can be customized to show the metrics and logs that are most important to the user, and the dashboards can be shared with other users. Although some examples are described with reference to Sumo Logic dashboards, the same principles may be used for dashboards of other software tools.

The Sumo Logic dashboards are built using the Sumo Logic Dashboarding Language (SDL), a declarative language that facilitates the creation of complex dashboards without having to write any code. For example, SDL can be used to create charts and tables, filter and drill down into data, and other visualizations. The dashboards make it easy to see trends and patterns in the data to assist in identifying problems and opportunities. Also, the dashboards can help monitor the user applications and track metrics such as CPU usage, memory usage, and latency.

When users create dashboards, the users may name different scripts, queries, or functions with useful names (e.g., show memory usage, show top nodes in CPU utilization), and these names can be used for autocomplete purposes as well as to identify search queries that may be useful during troubleshooting.

As users write queries, they often choose to save the most useful queries for later use. The system provides various features that enable users to organize their saved content, such as folders and sharing settings. Through regular use of the product, engaged users will accumulate a substantial library of saved searches, dashboards, alerts, and similar content. This library of saved content provides valuable insights into the types of data analysis and information that users deem important, as evidenced by the fact that users take care to conduct the analysis and save it for future reference. The richness of this dataset reflects users' priorities and interests with regard to data analysis and can be used to prioritize search results and autocomplete suggestions.

FIG. 11 is a flowchart of a method 1100 for generating query recommendations, according to some examples. While the various operations in this flowchart are presented and described sequentially, one of ordinary skill will appreciate that some or all of the operations may be executed in a different order, be combined or omitted, or be executed in parallel.

The present examples utilize various data sources to provide personalized recommendations to users. One data source is the prior log-search queries conducted by individual users within the system (e.g., the user ID, the query, and a label). Another data source is the status of any alerts configured by the user's organization that are currently active (e.g., alert status, alert description, and alert query).

Additionally, some examples leverage the knowledge of all dashboards and panels configured by users (e.g., dashboard title, panel title, and queries associated with the panels). Dashboard viewing statistics at the individual user level also inform the recommendations (e.g., dashboard ID, statistics on the dashboard ID, such as count of number of times used). That is, the system comprehensively instruments and logs all interactions users have with the system and uses this information to select the most relevant data.

Furthermore, the system considers not just individual users in isolation but also their peers within the same tenant organization. For example, if Acme Corp is a customer, and there is historical interaction data for both Alice and Bob, who both work at Acme, then the user data and the peer data for a tenant organization will factor into the generated recommendations.

At operation 1102, a check is made to determine if the user has entered any input in the search field (e.g., search field 104 in FIG. 1). If no input has been received, it means that this is the initial state of the search, and the search for query suggestions continues to operation 1104 to determine the recently triggered alerts within a predetermined time period (e.g., last five minutes, last hour, today, last 12 hours, last 24 hours, etc.).

For example, suppose a billing server has active alerts. In that case, the system will automatically recommend natural language queries related to the logs for the billing server (e.g., "Show me the logs for the billing server").

From operation 1104, the method 1100 flows to operation 1106 to identify previously-entered queries that search for logs of the same source category as the triggered alerts (e.g., search for logs with_sourceCategory equal to the source category of one triggered alert identified in operation 1104).

A source category is a free-form metadata tag that can be used to categorize data sources. The source category is stored as metadata with the stored log information. The source categories can be used to define the scope of searches, index and partition data, and control who sees what data. In some examples, the source category is stored in a field called_sourceCategory, which can be used to filter searches, index the data, and control access to the data. For example, a source category may be defined as "Billing" and will be used for billing-related resources (e.g., servers, reports, billing software). In another example, the source category may be called Prod Web Apache Access to categorize the Apache web server access logs. This source category can then be used to filter searches to include Apache web server access logs. The source categories can also be used to index data, which creates a searchable database of related logs.

The system can provide personalized recommendations using metadata fields such as source categories because customers tend to organize and categorize their data using source categories. Therefore, the source category serves as an important metadata field for the analysis.

Given suspected source categories of interest, the system can provide various recommendations, such as displaying the logs or log counts for that source category, looking up dashboards or saved searches containing the same source category, etc. In this way, the source category is leveraged as pivotal metadata to infer user interest.

The system can also auto-suggest previously saved content associated with the source category of interest, which helps surface analyses that may be unknown to the user but relevant given the shared source category. For example, a colleague may have authored a valuable query on billing data that the user is unaware of. Connecting users interested in the same source categories enables discovery.

Source categories provide a useful pivot point for recommendations since users have invested effort in curating them. However, other metadata could also be used to compartmentalize and categorize data for recommendations. The key is utilizing metadata to infer user interest areas from large volumes of data and provide personalized suggestions based on those interests.

From operation 1106, the method 1100 flows to operation 1108 to identify queries based on the searches of similar users and their top-searched source categories. For example, the recent search queries of similar users are identified, and the source categories in those searches are selected to provide suggested searches for logs in those search categories.

The system leverages social network analysis to provide personalized recommendations. For example, the system determines the source categories that a given user, such as Alice, frequently accesses and then identifies other users who look at similar source categories to Alice. Based on the premise that users accessing the same categories likely have analogous roles or interests, the system recommends additional relevant source categories or saved queries from these similar users to Alice.

For example, if Bob often views the same source categories as Alice, the system will recommend to Alice source categories, past analyses, or queries authored by Bob, as these are likely also to be relevant to Alice. Users can save queries in the system by giving them meaningful names that describe the analysis, such as "Failing Payment Plans." The system can recommend saved queries to Alice based on their descriptive names and the fact that the queries were created by users with similar data source access patterns as Alice. In summary, by leveraging social network connections based on shared data source usage, the system provides personalized recommendations of supplemental source categories, analyses, and queries to the users.

From operation 1108, the method 1100 flows to operation 1110 to identify search queries that search for logs related to a predetermined number of the top most-searched source categories (e.g., the top 10 most-searched source categories).

The system can provide recommendations based on domain knowledge to display volumes or error counts for the most common data sources. For example, the system may show the number of logs from the billing server over time, or the number of errors from the billing server in the past hour, or per hour, over the past day. This leverages knowledge of data sources frequently accessed by users to provide analysis, e.g., overall log or error counts. The recommendations can be personalized or global. Personalized recommendations would analyze the specific source categories an individual user often searches and provide counts for those. Global recommendations would look at the most searched source categories across the entire organization and display the predefined analyses of interest or error counts for those popular categories. In summary, by leveraging domain knowledge of commonly accessed data sources, whether personalized or organization-wide, the system can recommend relevant log and error count analyses to users.

From operation 1110, the method 1100 flows to operation 1112 where the identified search queries are presented in the UI. When there is user input, the method 1100 flows from operation 1102 to operation 1114 for looking up dashboards and panel queries containing the source category of the triggered alert or alerts.

The system can provide query suggestions as the user starts to write a query. For example, the system can recommend relevant dashboards or panels by recommending those most frequently visited by the individual user, suggesting those often visited by similar peers, and proposing globally popular dashboards for all the users in the same company.

The system pre-generates candidate queries, and the user can simply click/select rather than type. These are presented as clickable buttons that, when clicked, become queries.

Further, query autocompletion and suggested queries leverage recommendation techniques. The system analyzes usage patterns to recommend individualized queries based on the user's own activity, peer activity, and overall tenant activity. By pre-generating statistically derived query recommendations, the system provides a frictionless method for users to construct queries without typing.

From operation 1114, the method 1100 flows to operation 1116 for looking up user log searches for queries containing the source category. Further, from operation 1116, the method 1100 flows to operation 1112. At this point, the system has generated multiple candidate analyses and queries to recommend to the user. However, more options may be generated than can reasonably be displayed. Therefore, the system ranks and selects a subset of recommended queries to present to the user.

For example, at the start, with no user-specific information, a generic popularity ranking may be used to select the top candidates. As the user starts to type or click suggested chips, the system re-calculates recommendations based on the new interaction data. In some examples, a machine-learning (ML) model can leverage past query presentations and user responses to rank the query suggestions and then select the highest-ranked query suggestions for presentation. The ML model considers what queries users tend to click on previously given a similar interaction context.

As the user continues to engage, the system accumulates more input data to refine the model's rankings. The model incorporates environmental signals and evolves to optimize suggestion relevance based on observed user behaviors. In this way, the system iteratively improves query recommendations as more user data becomes available during the search session. One goal is to select and rank the most useful queries to display to the user as the interaction progresses.

Figure 12:
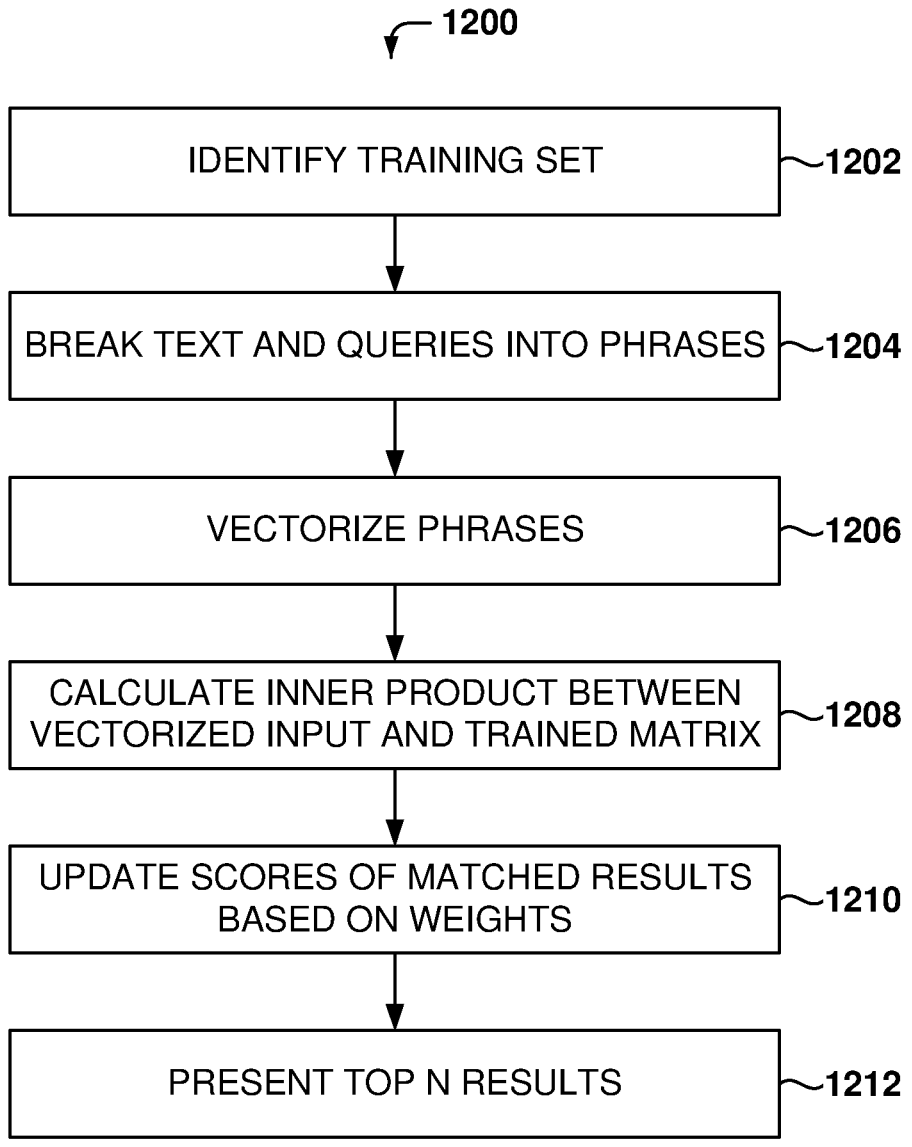
FIG. 12 is a flowchart of a method for generating autocomplete options, according to some examples.

FIG. 12 is a flowchart of a method 1200 for generating autocomplete options, according to some examples. While the various operations in this flowchart are presented and described sequentially, one of ordinary skill will appreciate that some or all of the operations may be executed in a different order, be combined or omitted, or be executed in parallel.

The system leverages natural language processing for auto-completion and suggestions and analyzes the corpus of past user queries, dashboard names, alert names, and other content. Customers provide natural language names and descriptions for dashboards, panels, and other artifacts that encapsulate the meaning of the underlying queries.

The autocomplete and natural language processing capabilities allow the system to understand previous queries, dashboards, and alerts created by the users. When a customer generates a dashboard within the product interface, the customer assigns a descriptive name, and this description name may be leveraged to understand the purpose of the query. For example, dashboard panels may be named "Web Traffic Overview," "Number of Requests," "Billing traffic," etc.

This provides a labeled dataset connecting queries and analyses with human-authored descriptive text. The system uses this dataset to train natural language models. Given a user's text input, these models can suggest relevant queries that match the semantic meaning. For example, if a user starts typing "web traffic overview," the system can auto-complete or recommend related queries on web traffic data based on learning the association between those keywords and queries from past dashboard names. For example, if the user types "show me web," an autocomplete suggestion may be "show me web traffic overview" because this query exists in one of the user panels.

Operation 1202 is for identifying a training set, as discussed above. The training set includes one or more of the prior log-search queries conducted by individual users within the system, the status of any alerts configured by the user's organization that are currently active is another data source, the information for dashboards and panels configured by users, or dashboard viewing statistics at the individual user level.

Some systems, like Sumo Logic, have a large number of queries. Also, apps that perform certain functions may be installed. Even though a user may not have installed some apps, the system could show relevant auto-complete suggestions based on that large library of app-related queries. For example, even though a custom internal dashboard for a unique in-house billing service may not be publicly available if a coworker created one and named it showing the purpose of the underlying query, the system could still map the user input to suggest that dashboard, even if the user is unaware of its existence.

From operation 1202, the method 1200 flows to operation 1204 where the training data is preprocessed to break text and queries into meaningful phrases. The preprocessing may include the following:

Split the sentences based on special symbols, such as a colon, "\n" (paragraph mark or new-line mark), "|", "//", a comma, an open-parenthesis symbol, a close-parenthesis symbol, a space, or "\\".

Replace some characters, such as "_" with nothing (e.g., deleting underscores), replacing "-" with a space, replacing "!=" with "is not", replacing "=" with "is", and replacing "\" with a comma.

Count the number of words in each phrase.

Count the occurrence of each phrase.

Remove duplicate phrases.

From operation 1204, the method 1200 flows to operation 1206 where the phrases are vectorized. In some examples, the phrases are vectorized using the tool TfidfVectorizer, but other tools may also be used. The result is a matrix of TF-IDF features. The results are vector embeddings for the phrases. Another example of a vectorizer is Word2Vec.

TF-IDF (Term Frequency-Inverse Document Frequency) is a statistical measure that is used to quantify the importance of a word in a document within a collection of documents. The TF-IDF value is calculated by multiplying two metrics: the Term Frequency (TF), which is the number of times a word appears in a document, and the Inverse Document Frequency (IDF), which is a measure of how common a word is in a collection of documents. The TF-IDF value is higher for words that appear frequently in a document but are not common in the collection of documents. This means that the words that are most likely to be relevant to a document will have high TF-IDF values.

From operation 1206, the method 1200 flows to operation 1208 to calculate the inner product between the vectorized user input and the trained matrix of features using linear kernel in order to find phrases from the training set that are similar to the user input.

From operation 1208, the method 1200 flows to operation 1210 to update the scores of matched results by multiplying the scores by their weights (e.g., Euclidean norm of the count vector). A predetermined number of the top-matched results are selected for presentation to the user.

From operation 1210, the method 1200 flows to operation 1212 where the output phrases are mapped to the query and presented on the UI.

Figure 13:
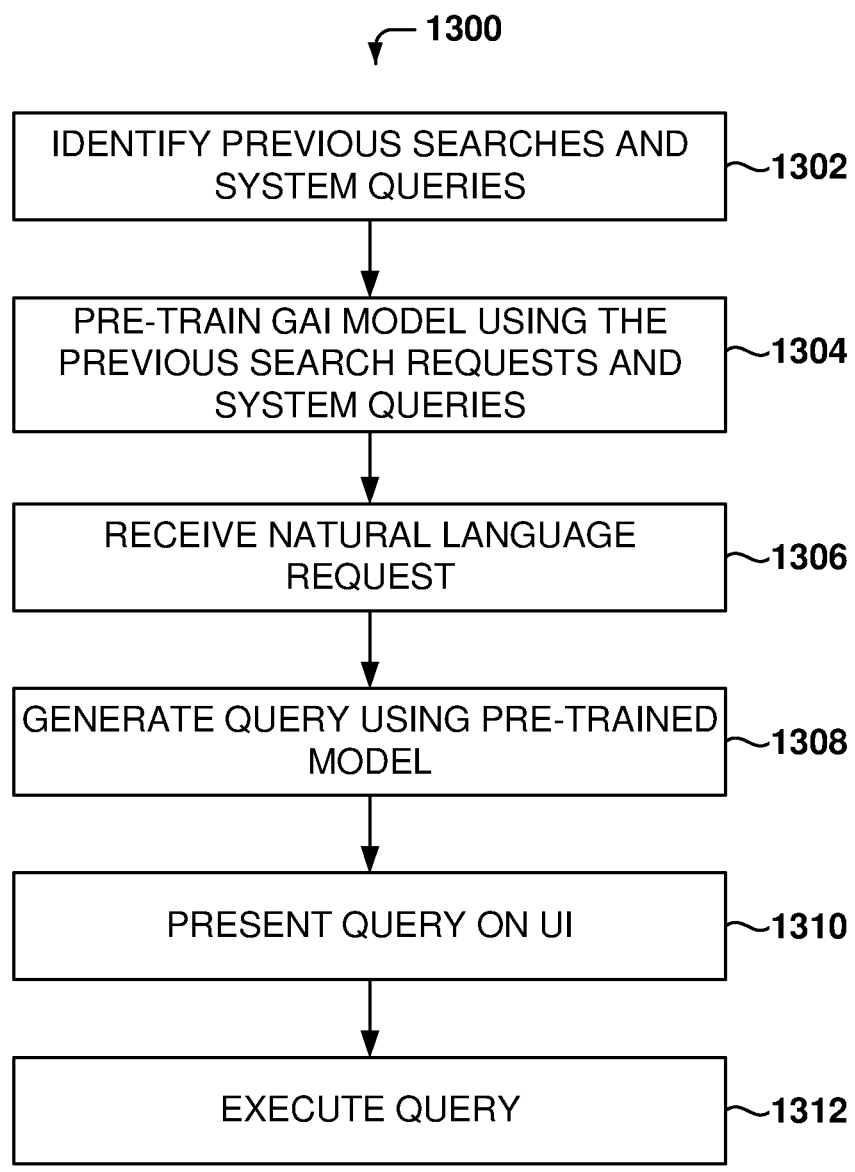
FIG. 13 is a flowchart of a method for converting a natural language request into a search query, according to some examples.

FIG. 13 is a flowchart of a method 1300 for converting a natural language request into a search query, according to some examples. While the various operations in this flowchart are presented and described sequentially, one of ordinary skill will appreciate that some or all of the operations may be executed in a different order, be combined or omitted, or be executed in parallel.

Operation 1302 is for identifying previous searches and queries, including those configured in user panels. From operation 1302, the method 1300 flows to operation 1304 to pre-train a T5 transformer model. The T5 model is pre-trained on the previous search request and system queries.

T5, or Text-to-Text Transfer Transformer, is a transformer model, which means that it is based on the transformer architecture, which is a neural network architecture that is particularly well-suited for natural language processing tasks. T5 is a unified text-to-text model, which means that it can be used for a variety of text-to-text tasks, such as text summarization to summarize a long piece of text into a shorter, more concise version, question answering to answer questions about a given piece of text, and text generation to generate new text, such as poems, code, scripts, musical pieces, email, letters, etc. T5 was pre-trained on a massive dataset of text and code, and it can be fine-tuned for specific tasks.

Below are a few examples of prompts used for fine-tuning the T5 model.

("Show me count of top 10 source categories","_sourceCategory=* I count by _sourceCategory I top 10 _sourceCategory by _count"),
("get logs for analytics containing text \"signature library\"","_sourceCategory=analytics \"signature library\""),
("find the top 10 most active users","_sourceCategory=* | parse \"user=*\" as user | count by user | top 10 user by _count"),
("all log messages containing the text \"error\"","_sourceCategory=* \"error\""),
("find the average response time for a specific endpoint ","_sourceCategory=myapp/access | parse \"method=* endpoint=* duration=*\""),
("find log messages where host is light-ingest and log level -continued

```
        is error","_sourcecategory=* host=light-ingest AND
        level=ERROR"),
    ("find log messages with an error and count the results by
        source host and source category","_sourceCategory=*
        \"error\" | count by
    ("find the top 10 error logs by count", "_sourceCategory=*
        \"error\" | count by message | sort by _count desc |
        limit 10"),
    ("sorts the logs by the \"count\" field in descending order",
        "_sourceCategory=* | count as count by host | sort count
        desc"),
    ("groups log messages by the \"host\" field",
        "_sourceCategory=* | group by host"),
    ("count the number of log messages in each time slice",
        "_sourcecategory=* | timeslice 1h | count as count by
        _timeslice"),
    ("show me log messages for kattaException", "_sourceCategory=*
        \"kattaException\""),
    ("show me logs for stream", "_sourceCategory=* \"stream\""),
    ("count errors in stream by sourceHost and display the top 10",
        "_sourceCategory=stream error | count by sourceHost |
        top 10 source
    ("display top 10 logs in stream","_sourcecategory=stream |
        count by _sourceHost | top 10 _sourceHost by _count"),
    ("show me logs", "_sourceCategory=*"),
    ("show me logs for analytics",
        "_sourceCategory=\"analytics\""),
    ("show me logs for stream where callerModule is report",
        "_sourceCategory=\"stream\" callerModule = \"report\""),
    ("show me logs for service where sourceHost is light-ingest",
        "_sourceCategory=\"service\" callerModule = \"light-
        ingest\"")
```

Some of the operations used for the training include one or more of the following:

Tokenize the input and output: get data_id and attention-_masks. The target values are prepended with a label explaining the intent of the translation.

Feed the above into the forward function and generate a Seq2SeqModelOutput.

Evaluate the cross-entropy loss between predictions and labels.

Do a backward pass to update the weights and bias.

Update the weights and correct the gradient bias. Use optimizer that applies weight decay to all hyperparameters except bias and layer normalization terms.

This process may be repeated for a number of epochs (e.g., ten epochs, but other values may also be used). Here is an example of hyperparameters used:

```
        t5_model.generate(
            input_ids=test_input_ids,
            attention_mask=test_attention_mask,
            max_length=64,
            early_stopping=True,
            num_beams=15,
            num_return_sequences=3,
            no_repeat_ngram_size=2
        )
```

From operation 1304, the method 1300 flows to operation 1306, where a natural-language request (e.g., search query) is received.

From operation 1306, the method 1300 flows to operation 1308 where one or more queries are generated using the pre-trained model. In some examples, the input for the model is the natural language request entered by the user, and the output of the model is one or more query suggestions.

From operation 1308, the method 1300 flows to operation 1310 where the one or more queries identified by the model are presented on the UI.

From operation 1310, the method 1300 flows to operation 1312, where, after receiving a request from the user, one of the suggested queries is executed.

FIG. 14 is a flowchart of a method 1400 for generating query recommendations, according to some examples. While the various operations in this flowchart are presented and described sequentially, one of ordinary skill will appreciate that some or all of the operations may be executed in a different order, be combined or omitted, or be executed in parallel.

Operation 1402 is for causing presentation of a UI on a device of a user, the UI providing options for searching log data stored by an online service.

From operation 1402, the method 1400 flows to operation 1404 to identify a plurality of search queries based on the user and one or more alerts generated by the online service. Operation 1404 comprises operations 1406, 1408, and 1410.

Operation 1406 is for identifying an alert triggered within a predetermined time period.

From operation 1406, the method 1400 flows to operation 1408 for determining a source category in the alert, the source category being a user-customizable metadata tag stored with the log data.

From operation 1408, the method 1400 flows to operation 1410 for identifying the plurality of search queries based on the source category.

From operation 1404, the method 1400 flows to operation 1412 to present the plurality of search queries on the UI as selectable options for searching the log data.

In view of the disclosure above, various examples are set forth below. It should be noted that one or more features of an example, taken in isolation or combination, should be considered within the disclosure of this application.

In some examples, identifying the plurality of search queries based on the source category further comprises identifying previously-entered search queries on the online service that search for logs having the source category as metadata.

In some examples, identifying the plurality of search queries based on the source category further comprises determining additional source categories used by other users of the online service, and identifying previously-entered search queries on the online service that search for logs having any of the additional source categories as metadata.

In some examples, identifying the plurality of search queries based on the source category further comprises determining most searched source categories across users of a same organization, and identifying search queries associated with the most searched source categories.

In some examples, the method 1400 further comprises detecting search text input entered via the UI: identifying a new plurality of search queries based on the search text input, the user, and the one or more alerts generated by the online service; and presenting the new plurality of search queries on the UI as selectable options for searching the log data.

In some examples, identifying a new plurality of search queries further comprises identifying query suggestions based on queries associated with customizable panels of dashboards created by users of the online service.

In some examples, identifying a new plurality of search queries further comprises identifying search queries received by the online service that contain a search for the source category.

In some examples, the method 1400 further comprises detecting a selection in the UI of a search query from the plurality of search queries, and executing the selected search query.

Another general aspect is for a system that includes a memory comprising instructions and one or more computer processors. The instructions, when executed by the one or more computer processors, cause the one or more computer processors to perform operations comprising: causing presentation of a user interface (UI) on a device of a user, the UI providing options for searching log data stored by an online service: identifying a plurality of search queries based on the user and one or more alerts generated by the online service, wherein identifying the plurality of search queries comprises: identifying an alert triggered within a predetermined time period: determining a source category in the alert, the source category being a user-customizable metadata tag stored with the log data; and identifying the plurality of search queries based on the source category; and presenting the plurality of search queries on the UI as selectable options for searching the log data.

In yet another general aspect, a non-transitory machine-readable storage medium (e.g., a non-transitory storage medium) includes instructions that, when executed by a machine, cause the machine to perform operations comprising: causing presentation of a user interface (UI) on a device of a user, the UI providing options for searching log data stored by an online service: identifying a plurality of search queries based on the user and one or more alerts generated by the online service, wherein identifying the plurality of search queries comprises: identifying an alert triggered within a predetermined time period: determining a source category in the alert, the source category being a user-customizable metadata tag stored with the log data; and identifying the plurality of search queries based on the source category; and presenting the plurality of search queries on the UI as selectable options for searching the log data.

FIG. 15 is a flowchart of a method 1500 for the automatic execution of queries, according to some examples. While the various operations in this flowchart are presented and described sequentially, one of ordinary skill will appreciate that some or all of the operations may be executed in a different order, combined, omitted, or executed in parallel.

The DCAP 602 aims to provide suggestions and rankings for insights and analyses based on user interactions and feedback. Operation 1502 is for identifying the context of the user. Context refers to the environmental parameters associated with a user interfacing with the DCAP 602, and the environmental parameters may include user information, history of user actions in the DCAP 602, data sources accessed by the user, information in the DCAP about the account of the user (e.g., active alerts, generated insights, playbooks executed), information about users related to the user (e.g., coworkers, history of use by related users), etc.

For example, the user has accessed information on certain data sources in the past that are directly related to the role of the user within a company, which may define the responsibility of the user.

The system analyzes the value of the parameters associated with the context to determine the current context of the user. The current context of the user is the use by the DCAP 602 to determine what actions and information the user may be interested in.

From operation 1502, the method 1500 flows to operation 1504 to determine query suggestions based on the context, e.g., areas of interest for troubleshooting based on the context of the user. The areas of interest may be determined based on the parameters of the context. For example, any active alert is considered to be interesting. Another example of an interesting parameter is when the value of CPU utilization exceeds 80% for more than five minutes. Another example is when disk capacity in one of the systems monitored by the user is above 95%.

In some examples, queries of interest may be determined by using an LLM with a prompt that includes parameters from the context of the user. More details regarding the use of the LLM are provided below with reference to FIG. 16.

From operation 1504, the method 1500 flows to operation 1506 to determine queries for automatic execution. In some examples, queries for automatic execution may be determined by using an LLM with a prompt that includes parameters from the context of the user. More details regarding the use of the LLM are provided below with reference to FIG. 16.

Other queries for execution may be determined by examining information on the dashboards accessed by the user. This will be helpful because users tend to configure the panels of their dashboards with the information that is most important to them. In some examples, the current values of the information presented in the dashboard are compared to another period of time (e.g., a week before when the system was running without detected problems), and the parameters that defer significantly between the two periods are considered interesting for further analysis.

The queries for execution may also include queries written by the user or by other users in the same company.

From operation 1506, the method 1500 flows to operation 1508 to automatically execute one or more of the determined queries at operation 1504.

In some examples, each of the queries may be assigned a relevance score by an ML model to determine how relevant the results of the query would be to solve the problem associated with the context of the user. The system then selects one or more of the queries with the highest relevance scores for automatic execution. The queries are executed automatically without requiring an express command from the user to execute those queries.

From operation 1508, the method 1500 flows to operation 1510 to generate insights for the executed queries. For the queries that are executed, the parameters associated with those queries are examined and compared against normal ranges of operation. Those parameters with values outside the normal range are identified as interesting insights for presentation on the user interface.

In some examples, one or more data sources associated with the context of the user are scanned to determine fields that are present in those data sources (e.g., CPU utilization, amount of network traffic by second, amount of free memory). The value of the fields on recent data is then examined to determine if they are outside a normal range of operation. Those fields with values outside the range are then flagged for presentation to the user with the corresponding values.

For example, one of the identified parameters is the average payload size by the host. It might be the case that one of the hosts is in a bad state because the average payload size is much bigger than in other similar hosts. In this case, a query for this parameter is identified from a plurality of available queries based on the name of the parameter, and the query, "Show me average payload size by host on the data ingestion component," would be executed.

From operation 1510, the method 1500 flows to operation 1512 for identifying action suggestions. In some examples, the action suggestions are based on the generated insights, e.g., insights that identify values of parameters outside the normal operating range.

The action suggestions may be based on existing playbooks that provide recommendations for actions to take by the system to solve a problem. The action suggestions may be presented in the UI, as described in more detail below, such as the act 710 recommendations of the UI 702 in FIG. 7.

From operation 1512, the method 1500 flows to operation 1514 for ranking the suggestions. Additionally, if the number of recommended actions is greater than a predetermined threshold (e.g., three or four), the recommended actions may also be ranked to determine which ones will be presented in the UI.

In some examples, the ranking is performed by a machine-learning model, as described in more detail below with reference to FIG. 17. The ML model generates a score for each suggestion based on their estimated relevance, and then the suggestions with the highest score are selected for presentation.

Additionally, some rules may be used to rank the suggestions. Each rule is associated with a suggestion and provides a score for ranking. For example, anything attached to errors or latencies will be given a high score, or the maximum score to guarantee that these types of suggestions are posted on the UI.

Additionally, rules for active alerts will also be given a high score because it is very likely that the user will be interested in anything related to alerts for troubleshooting problems.

Therefore, a mix of information from the ML model and the rules available may be used to select the most relevant suggestions. Additionally, a diversity factor may be used as a weight in order to increase the diversity of the results. For example, suggestions that are in the same category as suggestions with a higher score will have a weight of less than one to lower the score of these suggestions and increase diversity.

From operation 1514, the method 1500 flows to operation 1516 to present one or more of the insights and one or more suggestions based on the ranking. Examples of the presentation of insights, suggestions, and actions are presented in FIGS. 7 and 8. This helps the user because it solves two of the obstacles for users: knowing what question to ask the data and knowing how to formulate the question.

In some examples, the system automatically selects the most appropriate visualization for some of the insights, e.g., selecting a pie chart, a histogram, or line charts, for presenting information about a metric. In some examples, the LLM may be used to select the best visualization by entering a prompt, such as, "For presenting this data on a chart, what is the best representation (e.g., time series, bar chart, area chart, line chart) for presenting to a user?"

Figure 16:
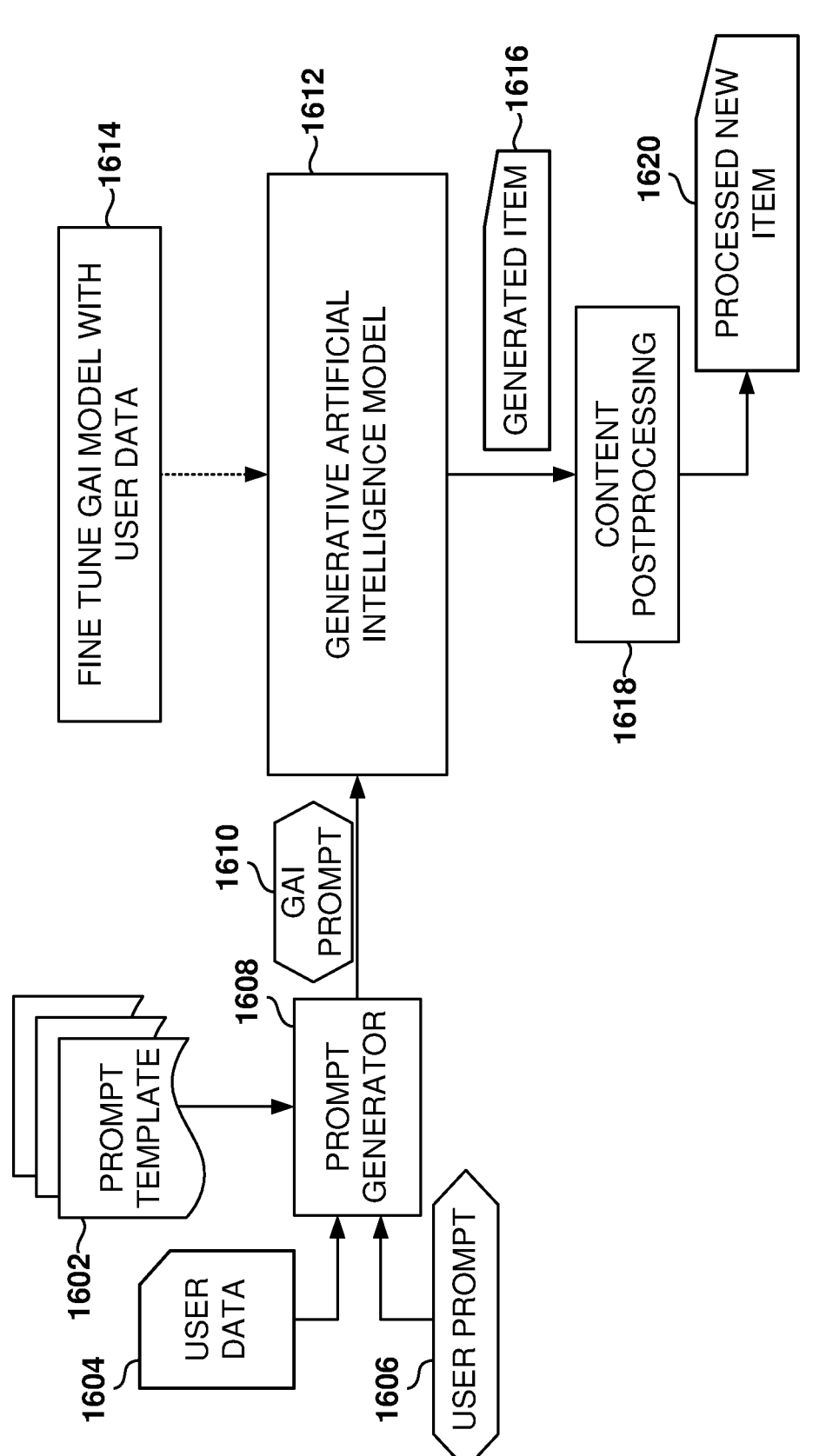
FIG. 16 illustrates the use of a Generative Artificial Intelligence (GAI) model to generate new content, according to some examples.

FIG. 16 illustrates the use of a Generative Artificial Intelligence (GAI) model 1612 to generate new content, according to some examples. GAI is a type of AI that can generate new content, such as images, text, video, or audio. The GAI model 1612 is trained on large datasets of data and uses this data to learn the patterns and relationships between different elements of the data. There are several types of GAI models, such as Generative Adversarial networks (GANs), Variational Autoencoders (VAEs), and Autoregressive models.

The GAI models generate items of different types, such as GAI models for creating text (e.g., GPT-4, Pathways Language Model 2 (PaLM 2), LaMDA), images (e.g., DALL-E 2, Stable Diffusion), videos (Runway Gen-2, Stable Diffusion Video), audio (e.g., Google MusicLM, Stable Audio), etc.

Often, the companies that create the GAI models make the GAI models available to users who can apply them to generate the desired content based on a GAI prompt 1610 provided to the GAI model 1612. Users can utilize the GAI model 1612 as provided by the vendor or can optionally fine-tune 1614 the GAI model 1612 with their user data to adjust the parameters of the GAI model 1612 in order to improve performance on a specific task or domain.

In some examples, fine-tuning the GAI model 1612 includes the following operations:

1. Collect user data: Gather a collection of user data that is relevant to the target task or domain. This data could include text, images, audio, or other types of data:
2. Label the data: if the task requires supervised learning, the user data is labeled with the correct outputs:
3. Select a fine-tuning method. Some of the methods for fine-tuning GAI models include Full fine-tuning, Few-shot fine-tuning, and Prompt-based fine-tuning:
4. Train the GAI model 1612: Perform incremental training of the tune 1614 using the selected fine-tuning method and
5. Optionally, evaluate the performance of the fine-tuned model on a held-out dataset.

The GAI model 1612 can be used to generate new content based on the GAI prompt 1610 used as input, and the GAI model 1612 creates a newly generated item 1616 as output.

The GAI prompt 1610 is a piece of text or code that is used to instruct the GAI model 1612 towards generating a desired output (e.g., generated item 1616). The GAI prompt 1610 provides context, instructions, and expectations for the output. The newly generated item 1616 may be multi-modal, such as a piece of text, an image, a video, an audio, a piece of programming code, etc., or a combination thereof.

Prompt engineering is the process of designing and crafting prompts to effectively instruct and guide a GAI model toward generating desired outputs. It involves selecting and structuring the text that forms the GAI prompt 1610 input to the GAI model 1612, ensuring that the GAI prompt 1610 accurately conveys the task, context, and desired style of the output.

A prompt generator 1608 is a computer program that generates the GAI prompt 1610. There are several ways to generate the GAI prompt 1610. In some examples, the prompt generator 1608 may use a user prompt 1606 entered by the user in plain language as the GAI prompt 1610. In other examples, the prompt generator 1608 creates the GAI prompt 1610 without having a user prompt 1606, such as by using a static pre-generated prompt based on the desired output.

In other examples, the prompt generator 1608 uses a prompt template 1602 to generate the GAI prompt 1610. The prompt template 1602 defines the structure of the GAI prompt 1610 and may include fields that may be filled in based on available information to generate the GAI prompt, such as user data 1604 or the user prompt 1606. The prompt template may also include rules for the creating of the GAI prompt (e.g., include specific text when the recipient resides in California, but do not include the text if the recipient does not reside in California). In other examples, the prompt generator 1608 uses heuristics codified into a computer program to generate the GAI prompt 1610.

In some examples, the GAI model 1612 is used to generate query suggestions by using a prompt that includes a request to generate suggestions based on data included in the prompt. For example, the prompt may be as follows:

I am troubleshooting a problem based on data received by a data analysis system, such as data received in logs. Given available data that includes <<insert metrics and metric values>>, What are potentially interesting queries that may be performed by the data analysis system that would help the user troubleshoot a problem?

In some examples, the GAI model 1612 is used to determine queries for automatic execution by using a prompt that includes a request to select suggestions for automatic execution based on the existing query suggestions. For example, the prompt may be as follows:

I am troubleshooting a problem based on data received by a data analysis system, such as data received in logs. Based on this list of query suggestions <<insert existing query suggestions>>, generate a ranked list from these query suggestions, wherein the higher the rank, the higher the probability that the execution of the query suggestion will produce results to solve the problem.

In another example, the queries previously requested by the user may also be included in the template to give the operation GAI model 1612 information about the activities of this user and may also include queries previously performed by users from the same company. An example of a prompt for using historical queries is as follows:

I am troubleshooting a problem based on data received by a data analysis system, such as data received in logs. Here are some of the previous queries requested by this user <<insert previous queries>>, What are potentially interesting queries that may be performed by the data analysis system that would help the user troubleshoot a problem?

In some examples, the GAI model 1612 is used to get descriptions of scripts. For example, a user may have access to many scripts, and many of them were not created by the user. The LLM may be used to obtain a description of a script. An example prompt would be:

Here is a Sumo query: <<insert query>>; analyze the query and describe what the query is doing in plain language.

The reverse is also possible: the user wants a query but the user wants a fast way to create a script that can be executed by the DCAP 602. An example prompt would be:

I want a query to obtain the number of hourly errors for the last seven weeks for a given host. Please write a query that obtains the number of hourly errors for the last seven weeks for a given host.

After the generated item 1616 is generated, an optional operation 1618 of content postprocessing may be performed to modify or block the newly generated item 1616, resulting in a processed new item 1620. The generated item 1616 may be post-processed for various reasons, including improving accuracy and consistency (e.g., checking for factual errors, grammatical mistakes, or inconsistencies in style or format): enhancing quality and relevance (e.g., removing irrelevant or redundant content, improving coherence and flow, ensuring that the output aligns with the intended purpose): enhancing output (e.g., polish wording, improve images, ensure that the style matches the desired effect); personalizing the new generated item 1616; and ensuring ethical and responsible use.

The generated item 1616 is new content, and it does not refer to content that is the result of editing or changing existing material (e.g., editing an image to include text within is not considered GAI-generated new content). One difference between the generated item 1616 and material created with editing tools is that the newly generated item 1616 is entirely new content, while the editing tool modifies existing content or creates the content one instruction at a time. Another difference is that the GAI model 1612 can produce highly creative and imaginative content, while editing tools focus on enhancing the existing content based on user commands. Another difference is that the GAI model 1612 can generate content rapidly, while the editing tools require more time and effort for thorough editing and refinement.

Another use case for the LLM is to rank insights. Here is a sample prompt:

From the following insights: <<insert insights>>, provide a ranked list of the insights that would be most relevant for a user troubleshooting <<insert problem>>.

Figure 17:
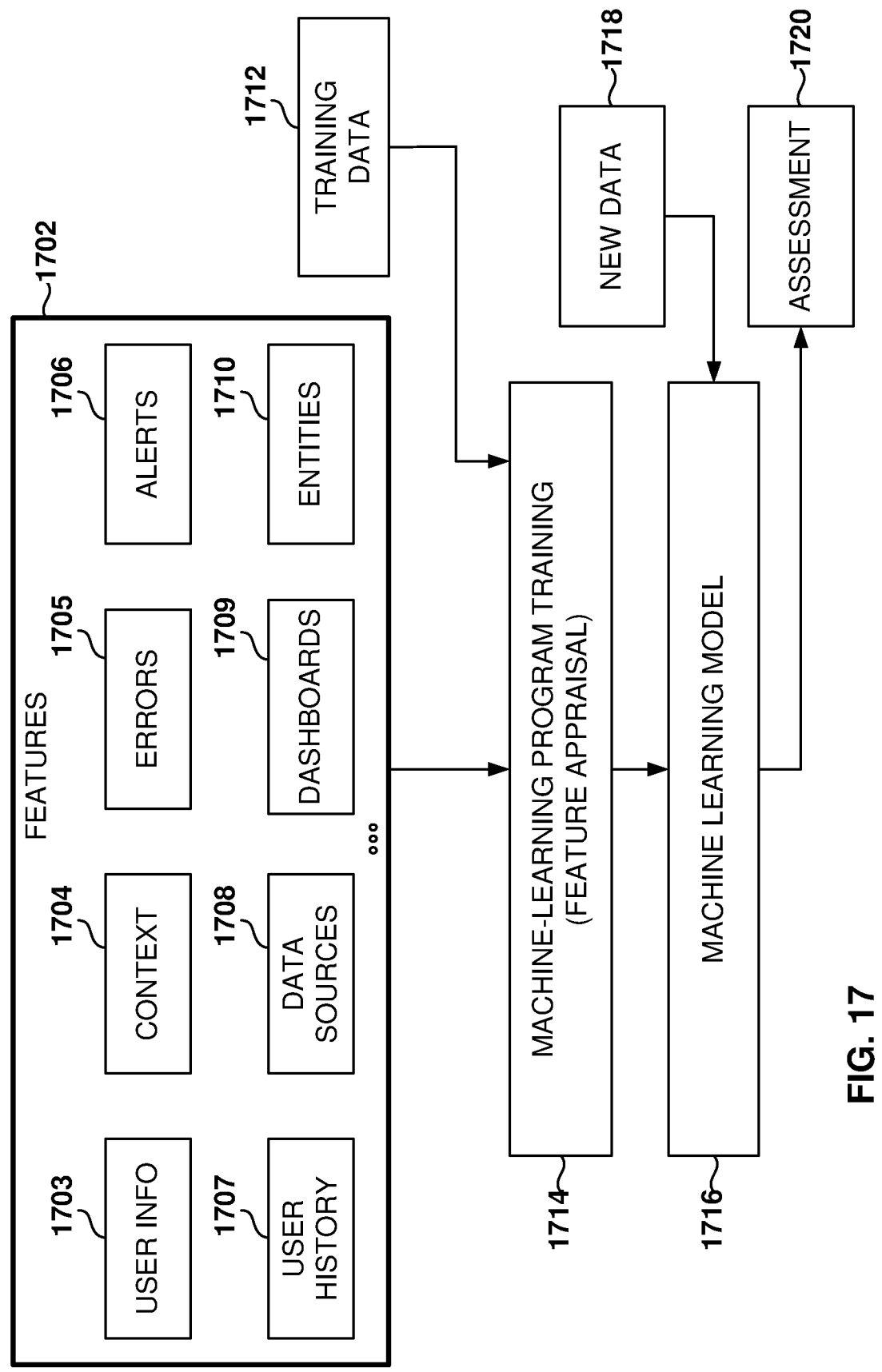
FIG. 17 illustrates the training and use of a machine-learning model, according to some example examples.

FIG. 17 illustrates the training and use of a machine-learning model, according to some example examples. In some examples, machine learning (ML) models 1716 are utilized to rank items by providing relevance scores.

Machine Learning (ML) is an application that provides computer systems the ability to perform tasks without explicitly being programmed by making inferences based on patterns found in the analysis of data. Machine learning explores the study and construction of algorithms, also referred to herein as tools, that may learn from existing data and make predictions about new data. Such machine-learning algorithms operate by building an ML model 1716 from training data 1712 in order to make data-driven predictions or decisions expressed as outputs or assessments 1720. Although examples are presented with respect to a few machine-learning tools, the principles presented herein may be applied to other machine-learning tools.

Data representation refers to the method of organizing the data for storage on a computer system, including the structure for the identified features and their values. In ML, it is typical to represent the data in vectors or matrices of two or more dimensions. When dealing with large amounts of data and many features, data representation is essential so that the training is able to identify the correlations within the data.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm, using information that is neither classified nor labeled and allowing the algorithm to act on that information without guidance. Unsupervised ML is useful in exploratory analysis because it can automatically identify structure in data.

Typical tasks for supervised ML are classification problems and regression problems. Classification problems, also referred to as categorization problems, aim to classify items into one of several category values (for example, is this object an apple or an orange?). Regression algorithms aim to quantify some items (for example, by providing a score to the value of some input). Some examples of commonly used supervised ML algorithms are Logistic Regression (LR), Naive-Bayes, Random Forest (RF), neural networks (NN), deep neural networks (DNN), matrix factorization, and Support Vector Machines (SVM).

Some typical tasks for unsupervised ML include clustering, representation learning, and density estimation. Some examples of commonly used unsupervised ML algorithms are K-means clustering, principal component analysis, and autoencoders.

The training data 1712 comprises examples of values for the features 1702. In some examples, the training data comprises labeled data with examples of values for the features 1702 and labels indicating the outcome, such as queries executed by the user and a label indicating if each query contributed to the resolution of a problem.

The machine-learning algorithms utilize the training data 1712 to find correlations among identified features 1702 that affect the outcome. A feature 1702 is an individual measurable property of a phenomenon being observed. The concept of a feature is related to that of an explanatory variable used in statistical techniques such as linear regression. Choosing informative, discriminating, and independent features is essential for the effective operation of ML in pattern recognition, classification, and regression. Features may be of different types, such as numeric, strings, categorical, and graph. A categorical feature is a feature that may be assigned a value from a plurality of predetermined possible values (e.g., this animal is a dog, a cat, or a bird).

In some examples, the features 1702 may be of different types and may include one or more of information about the user 1703, the context of the user 1704, errors 1705 received by the DCAP 602, alerts 1706 generated, user history 1707 (e.g., queries previously executed by the user), data sources 1708, dashboards 1709 used by users of the DCAP 602, entities 1710 associated with a given problem or error message, etc.

During training 1714, the ML program, also referred to as ML algorithm or ML tool, analyzes the training data 1712 based on identified features 1702 and configuration parameters defined for the training. The result of training 1714 is the ML model 1716, which is capable of taking inputs to produce assessments.

Training an ML algorithm involves analyzing large amounts of data (e.g., from several gigabytes to a terabyte or more) in order to find data correlations. The ML algorithms utilize the training data 1712 to find correlations among the identified features 1702 that affect the outcome or assessment 1720. In some examples, the training data 1712 includes labeled data, which is known data for one or more identified features 1702 and one or more outcomes, such as the query assisted in resolving a problem, a suggestion was selected by a user, etc.

The ML algorithms usually explore many possible functions and parameters before finding what the ML algorithms identify to be the best correlations within the data; therefore, training may make use of large amounts of computing resources and time.

When the ML model 1716 is used to perform an assessment, new data 1718 is provided as input to the ML model 1716, and the ML model 1716 generates the assessment 1720 as output. For example, when a suggestion is ranked by the ML model 1716, a relevance score is provided, where the higher the relevance score, the higher the probability that the suggestion will be selected by the user.

In some examples, candidate actions to be performed automatically, without a user request to perform the action, are given relevance scores by the DCAP 602, where the higher the relevance score, the higher the probability that the action will provide useful information to troubleshoot a problem.

In some examples, suggestions of scripts to be selected by the user are given a suggestion relevance score, where the highest the suggestion relevance score, the higher the probability that the suggestion will be selected by the user or that the suggestion will assist with useful information to diagnose a problem.

In some examples, results obtained by the model 1716 during operation (e.g., assessment 1720 produced by the model in response to inputs) are used to improve the training data 1712, which is then used to generate a newer version of the model. Thus, a feedback loop is formed to use the results obtained by the model to improve the model.

FIG. 18 is a flowchart of a method 1800 for providing contextual suggestions and automated responses to users managing incidents within production or security environments, according to some examples, according to some examples. While the various operations in this flowchart are presented and described sequentially, one of ordinary skill will appreciate that some or all of the operations may be executed in a different order, combined, omitted, or executed in parallel.

Operation 1802 is for identifying, by a data collection and analysis platform (DCAP), the context of a user while the DCAP is providing a user interface (UI) on a device associated with the user, the context containing values of environmental parameters associated with the user:

From operation 1802, the method 1800 flows to operation 1804 for determining a plurality of queries based on the context of the user.

From operation 1804, the method 1800 flows to operation 1806 to select one or more automatic queries, from the plurality of queries, for automatic execution without requiring a user request to perform the one or more automatic queries.

From operation 1806, the method 1800 flows to operation 1808 to automatically execute the one or more automatic queries by the DCAP.

From operation 1808, the method 1800 flows to operation 1810 for generating insights based on results from the execution of the one or more automatic queries.

From operation 1810, the method 1800 flows to operation 1812 to cause presentation in the UI of the generated insights and one or more queries selected from the plurality of queries.

In some examples, determining the plurality of queries comprises: generating a prompt with information about the context of the user, and providing the prompt as input to a Generative Artificial Intelligence (GAI) model to generate the plurality of queries.

In some examples, determining the plurality of queries comprises: identifying queries previously requested by the user, creating a prompt based on the queries previously requested by the user, and providing the prompt as input to a Generative Artificial Intelligence (GAI) model to generate the plurality of queries.

In some examples, selecting one or more automatic queries from the plurality of queries comprises: generating, by a machine-learning model, a relevance score for each query from the plurality of queries, wherein the higher the relevance score, the higher the probability that the query will be selected by the user; and selecting the one or more automatic queries from the plurality of queries based on the relevance score of the queries.

In some examples, generating insights further comprises: identifying values of parameters obtained by the executed queries, determining if the values of the parameters are outside a predefined range of values, and selecting insights with values outside the predefined range of values.

In some examples, the method 1800 further comprises determining action suggestions for solving a problem, and causing presentation of the action suggestions in the UI.

In some examples, the UI comprises: information about an automatically generated query, information about devices associated with the query, one or more suggestion actions, one or more queries associated with the context, and one or more queries related to previous scripts requested by the user.

In some examples, the environmental parameters of the context comprise one or more of user information, history of user actions in the DCAP, data sources accessed by the user, and information about users related to the user.

In some examples, the method 1800 further comprises utilizing a GAI model to obtain plain language descriptions of one or more from the plurality of queries.

In some examples, the method 1800 further comprises utilizing a GAI model to generate a query based on requests entered in plain language.

Another general aspect is for a system that includes a memory comprising instructions and one or more computer processors. The instructions, when executed by the one or more computer processors, cause the one or more computer processors to perform operations comprising: identifying, by a data collection and analysis platform (DCAP), a context of a user while the DCAP is providing a user interface (UI) on a device associated with the user, the context containing values of environmental parameters associated with the user; determining a plurality of queries based on the context of the user; selecting one or more automatic queries, from the plurality of queries, for automatic execution without requiring a user request to perform the one or more automatic queries: automatically executing the one or more automatic queries by the DCAP; generating insights based on results from the execution of the one or more automatic queries; and causing presentation in the UI of the generated insights and one or more queries selected from the plurality of queries.

In yet another general aspect, a tangible machine-readable storage medium (e.g., a non-transitory storage medium) includes instructions that, when executed by a machine, cause the machine to perform operations comprising: identifying, by a data collection and analysis platform (DCAP), a context of a user while the DCAP is providing a user interface (UI) on a device associated with the user, the context containing values of environmental parameters associated with the user: determining a plurality of queries based on the context of the user: selecting one or more automatic queries, from the plurality of queries, for automatic execution without requiring a user request to perform the one or more automatic queries: automatically executing the one or more automatic queries by the DCAP: generating insights based on results from the execution of the one or more automatic queries; and causing presentation in the UI of the generated insights and one or more queries selected from the plurality of queries.

Figure 19:
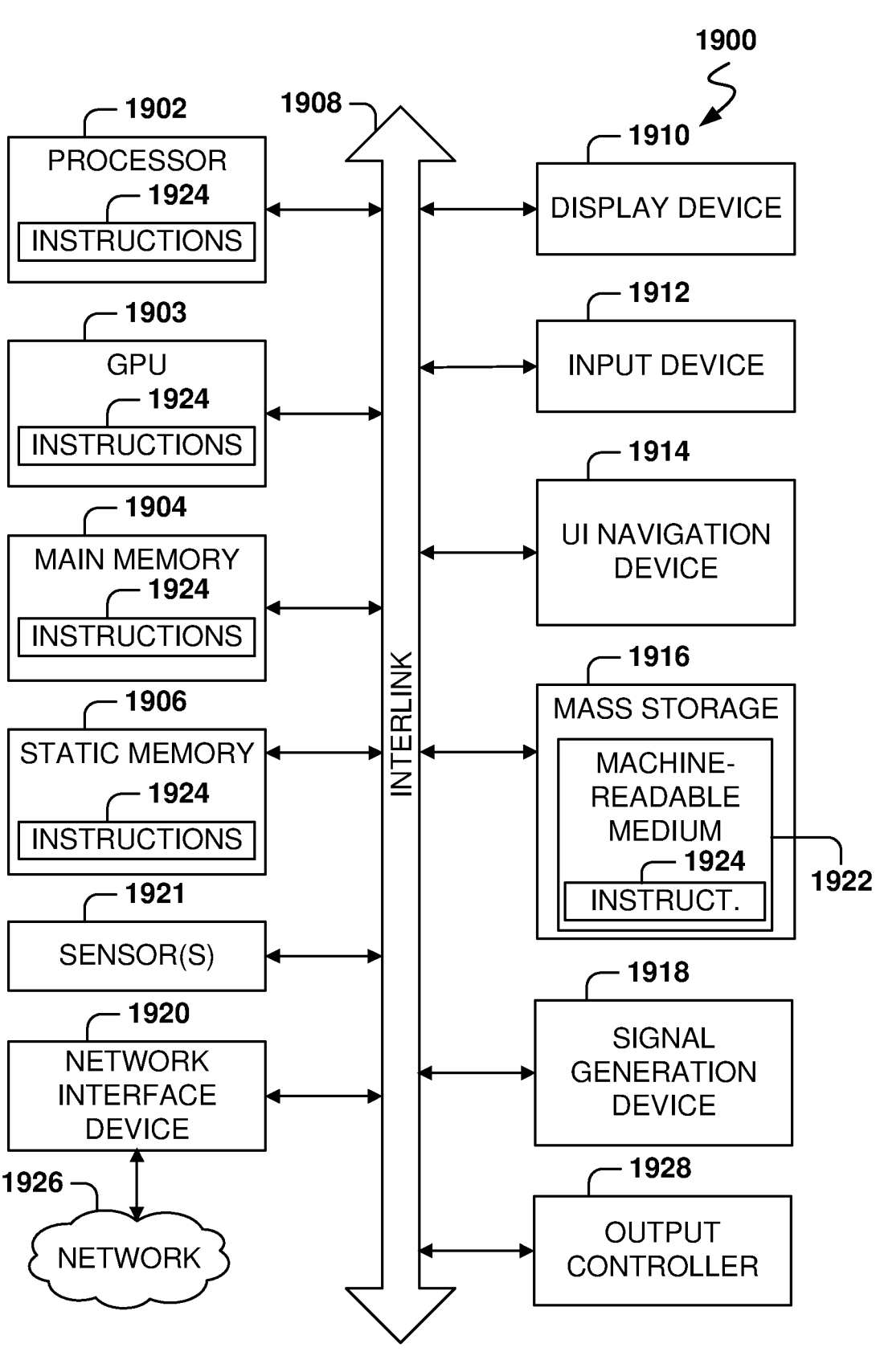
FIG. 19 is a block diagram illustrating an example of a machine upon or by which one or more process examples described herein may be implemented or controlled.

FIG. 19 is a block diagram illustrating an example of a machine 1900 upon or by which one or more process examples described herein may be implemented or controlled. In alternative examples, the machine 1900 may operate as a standalone device or may be connected (e.g., networked) to other machines. In a networked deployment, the machine 1900 may operate in the capacity of a server machine, a client machine, or both in server-client network environments. In an example, the machine 1900 may act as a peer machine in a peer-to-peer (P2P) (or other distributed)

network environment. Further, while only a single machine 1900 is illustrated, the term "machine" shall also be taken to include any collection of machines that individually or jointly execute a set (or multiple sets) of instructions to perform any one or more of the methodologies discussed herein, such as via cloud computing, software as a service (Saas), or other computer cluster configurations.

Examples, as described herein, may include, or may operate by, logic, various components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine 1900 (e.g., computer system) may include a hardware processor 1902 (e.g., a central processing unit (CPU), a hardware processor core, or any combination thereof), a graphics processing unit (GPU 1903), a main memory 1904, and a static memory 1906, some or all of which may communicate with each other via an interlink 1908 (e.g., bus). The machine 1900 may further include a display device 1910, an alphanumeric input device 1912 (e.g., a keyboard), and a user interface (UI) navigation device 1914 (e.g., a mouse). In an example, the display device 1910, alphanumeric input device 1912, and UI navigation device 1914 may be a touch screen display. The machine 1900 may additionally include a mass storage device 1916 (e.g., drive unit), a signal generation device 1918 (e.g., a speaker), a network interface device 1920, and one or more sensors 1921, such as a Global Positioning System (GPS) sensor, compass, accelerometer, or another sensor. The machine 1900 may include an output controller 1928, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1916 may include a machine-readable medium 1922 on which is stored one or more sets of data structures or instructions 1924 (e.g., software) embodying or utilized by any one or more of the techniques or functions described herein. The instructions 1924 may also reside, completely or at least partially, within the main memory 1904, within the static memory 1906, within the hardware processor 1902, or within the GPU 1903 during execution thereof by the machine 1900. In an example, one or any combination of the hardware processor 1902, the GPU 1903, the main memory 1904, the static memory 1906, or the mass storage device 1916 may constitute machine-readable media.

While the machine-readable medium 1922 is illustrated as a single medium, the term "machine-readable medium" may include a single medium, or multiple media, (e.g., a centralized or distributed database, and/or associated caches and servers) configured to store the one or more instructions 1924.

The term "machine-readable medium" may include any medium that is capable of storing, encoding, or carrying instructions 1924 for execution by the machine 1900 and that cause the machine 1900 to perform any one or more of the techniques of the present disclosure, or that is capable of storing, encoding, or carrying data structures used by or associated with such instructions 1924. Non-limiting machine-readable medium examples may include solid-state memories, and optical and magnetic media. In an example, a massed machine-readable medium comprises a machine-readable medium 1922 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices: magnetic disks, such as internal hard disks and removable disks; magneto-optical disks; and CD-ROM and DVD-ROM disks.

The instructions 1924 may further be transmitted or received over a communications network 1926 using a transmission medium via the network interface device 1920.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Additionally, as used in this disclosure, phrases of the form "at least one of an A, a B, or a C," "at least one of A, B, and C," and the like, should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various examples of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of examples of the present disclosure as represented by the appended claims. The specification and drawings are, accordingly, to be regarded in an illustrative rather than a restrictive sense.

What is claimed is:

1. A computer-implemented method comprising:

identifying, by a data collection and analysis platform (DCAP), a context of a user while the DCAP is providing a user interface (UI) on a device associated with the user, the context containing values of environmental parameters associated with the user comprising actions of the user in the DCAP, configured alerts to notify the user when a problem is detected, and alerts investigated by the user;

determining alerts triggered within a predetermined time period;

determining a plurality of queries based on the context of the user and the alerts triggered within the predetermined time period, wherein determining the plurality of queries comprises:

generating a prompt with information about the context of the user and the alerts triggered within the predetermined time period, the prompt comprising the alerts triggered and the context with the actions of the user in the DCAP, the configured alerts, and the alerts investigated in natural language text to instruct a Large Language Model (LLM) towards generating the plurality of queries, and providing the prompt as input to the LLM to generate the plurality of queries;

selecting one or more automatic queries, from the plurality of queries, for automatic execution without requiring a user request to perform the one or more automatic queries;

automatically executing the one or more automatic queries by the DCAP;

generating insights based on results from the execution of the one or more automatic queries, the insights providing information about at least one metric associated with the one or more automatic queries; and causing presentation in the UI of the generated insights and one or more queries selected from the plurality of queries.

2. The method as recited in claim 1, wherein determining the plurality of queries further comprises:

identifying queries previously requested by the user;

determining alerts triggered in the DCAP within the predetermined time period; and creating the prompt based on the queries previously requested by the user and the alerts triggered within the predetermined time period.

3. The method as recited in claim 1, wherein selecting one or more automatic queries from the plurality of queries comprises:

generating, by a machine-learning model, a relevance score for each query from the plurality of queries, wherein the higher the relevance score, the higher probability that the query will be selected by the user; and selecting the one or more automatic queries from the plurality of queries based on the relevance score of the queries.

4. The method as recited in claim 1, wherein generating insights further comprises:

identifying values of parameters obtained by the executed queries;

determining if the values of the parameters are outside a predefined range of values; and selecting insights with values outside the predefined range of values.

5. The method as recited in claim 1, further comprising:

determining action suggestions for solving a problem; and causing presentation of the action suggestions in the UI.

6. The method as recited in claim 1, wherein the UI comprises:

information about an automatically generated query;

information about devices associated with the query;

one or more suggestion actions;

one or more queries associated with the context; and one or more queries related to previous scripts requested by the user.

7. The method as recited in claim 1, wherein the environmental parameters of the context further comprise one or more of user information, data sources accessed by the user, and information about members related to the user.

8. The method as recited in claim 1, further comprising:

utilizing the LLM to obtain plain language descriptions of one or more from the plurality of queries.

9. The method as recited in claim 1, further comprising:

detecting a request being entered in plain language to search for logs;

showing a list of autocomplete suggestions for the request in plain language; and utilizing the LLM to generate a query based on a request selected from the list of autocomplete suggestions in plain language.

10. A system comprising:

a memory comprising instructions; and one or more computer processors, wherein the instructions, when executed by the one or more computer processors, cause the system to perform operations comprising:

identifying, by a data collection and analysis platform (DCAP), a context of a user while the DCAP is providing a user interface (UI) on a device associated with the user, the context containing values of environmental parameters associated with the user comprising actions of the user in the DCAP, configured alerts to notify the user when a problem is detected, and alerts investigated by the user, determining alerts triggered within a predetermined time period;

determining a plurality of queries based on the context of the user and the alerts triggered within the predetermined time period, wherein determining the plurality of queries comprises:

generating a prompt with information about the context of the user and the alerts triggered within the predetermined time period, the prompt comprising the context with the actions of the user in the DCAP, the configured alerts, and the alerts investigated in natural language text to instruct a Large Language Model (LLM) towards generating the plurality of queries; and providing the prompt as input to the LLM to generate the plurality of queries;

selecting one or more automatic queries, from the plurality of queries, for automatic execution without requiring a user request to perform the one or more automatic queries;

automatically executing the one or more automatic queries by the DCAP;

generating insights based on results from the execution of the one or more automatic queries, the insights providing information about at least one metric associated with the one or more automatic queries; and causing presentation in the UI of the generated insights and one or more queries selected from the plurality of queries.

11. The system as recited in claim 10, wherein determining the plurality of queries further comprises:

identifying queries previously requested by the user;

determining alerts triggered in the DCAP within the predetermined time period; and creating the prompt based on the queries previously requested by the user and the alerts triggered within the predetermined time period.

12. The system as recited in claim 10, wherein selecting one or more automatic queries from the plurality of queries comprises:

generating, by a machine-learning model, a relevance score for each query from the plurality of queries, wherein the higher the relevance score, the higher probability that the query will be selected by the user; and selecting the one or more automatic queries from the plurality of queries based on the relevance score of the queries.

13. The system as recited in claim 10, wherein generating insights further comprises:

identifying values of parameters obtained by the executed queries;

determining if the values of the parameters are outside a predefined range of values; and selecting insights with values outside the predefined range of values.

14. A non-transitory machine-readable storage medium including instructions that, when executed by a machine, cause the machine to perform operations comprising:

identifying, by a data collection and analysis platform (DCAP), a context of a user while the DCAP is providing a user interface (UI) on a device associated with the user, the context containing values of environmental parameters associated with the user comprising actions of the user in the DCAP, configured alerts to notify the user when a problem is detected, and alerts investigated by the user;

determining alerts triggered within a predetermined time period;

determining a plurality of queries based on the context of the user and the alerts triggered within the predetermined time period, wherein determining the plurality of queries comprises:

generating a prompt with information about the context of the user and the alerts triggered within the predetermined time period, the prompt comprising the context with the actions of the user in the DCAP, the configured alerts, and the alerts investigated in natural language text to instruct a Large Language Model (LLM) towards generating the plurality of queries; and providing the prompt as input to the LLM to generate the plurality of queries;

selecting one or more automatic queries, from the plurality of queries, for automatic execution without requiring a user request to perform the one or more automatic queries;

automatically executing the one or more automatic queries by the DCAP;

generating insights based on results from the execution of the one or more automatic queries, the insights providing information about at least one metric associated with the one or more automatic queries; and causing presentation in the UI of the generated insights and one or more queries selected from the plurality of queries.

15. The non-transitory machine-readable storage medium as recited in claim 14, wherein determining the plurality of further comprises:

identifying queries previously requested by the user;

determining alerts triggered in the DCAP within the predetermined time period; and creating the prompt based on the queries previously requested by the user and the alerts triggered within the predetermined time period.

16. The non-transitory machine-readable storage medium as recited in claim 14, wherein selecting one or more automatic queries from the plurality of queries comprises:

generating, by a machine-learning model, a relevance score for each query from the plurality of queries, wherein the higher the relevance score, the higher probability that the query will be selected by the user; and selecting the one or more automatic queries from the plurality of queries based on the relevance score of the queries.

17. The non-transitory machine-readable storage medium as recited in claim 14, wherein generating insights further comprises:

identifying values of parameters obtained by the executed queries;

determining if the values of the parameters are outside a predefined range of values; and selecting insights with values outside the predefined range of values.

* * * * *